(12) United States Patent
Kang et al.

(10) Patent No.: US 11,188,741 B2
(45) Date of Patent: Nov. 30, 2021

(54) METHOD AND APPARATUS FOR PASSENGER RECOGNITION AND BOARDING SUPPORT OF AUTONOMOUS VEHICLE

(71) Applicant: LG Electronics Inc., Seoul (KR)

(72) Inventors: Sung Suk Kang, Gyeonggi-do (KR); Eun Suk Kim, Incheon (KR); Eun Ju Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 167 days.

(21) Appl. No.: 16/559,114

(22) Filed: Sep. 3, 2019

(65) Prior Publication Data

US 2020/0019761 A1 Jan. 16, 2020

(30) Foreign Application Priority Data

Aug. 26, 2019 (KR) .................. 10-2019-0104497

(51) Int. Cl.
  *G06K 9/00* (2006.01)
  *G06T 7/20* (2017.01)
  (Continued)

(52) U.S. Cl.
  CPC ..... *G06K 9/00288* (2013.01); *G06K 9/00268* (2013.01); *G06Q 10/02* (2013.01);
  (Continued)

(58) Field of Classification Search
  CPC ........... G06K 9/00288; G06K 9/00268; G06K 9/627; G06K 9/00791; G06K 9/00369; G06T 7/20; G06T 2207/20084; G06T 2207/30201; G06T 2207/30252; G08G 1/096833; G08G 1/133; G06Q 10/02
  See application file for complete search history.

(56) References Cited

U.S. PATENT DOCUMENTS

| 10,275,670 | B1* | 4/2019 | Li ..................... B60R 25/305 |
| 2020/0154341 | A1* | 5/2020 | Sun ................... H04W 72/042 |
| 2020/0160709 | A1* | 5/2020 | Ramot ............... G06Q 10/109 |

FOREIGN PATENT DOCUMENTS

| KR | 102003940 | 10/2019 | |
| WO | WO-2019023324 A1 * | 1/2019 | ......... G01C 21/3438 |

* cited by examiner

*Primary Examiner* — Dhaval V Patel
(74) *Attorney, Agent, or Firm* — Fish & Richardson P.C.

(57) ABSTRACT

Disclosed is an apparatus for passenger recognition and boarding/alighting support of an autonomous vehicle. An apparatus for passenger recognition and boarding/alighting support of an autonomous vehicle according to an embodiment of the present disclosure may include a vehicle communicator configured to receive scheduled passenger information, a sensor configured to sense people outside the vehicle, and a vehicle controller configured to extract a passenger candidate group by analyzing the sensed people outside the vehicle, and calculate the number of reserved passengers using the extracted passenger candidate group and the received scheduled passenger information. One or more of an autonomous vehicle, a server, and a terminal of the present disclosure may be associated or combined with an artificial intelligence module, a drone (Unmanned Aerial Vehicle, UAV), a robot, an AR (Augmented Reality) device, a VR (Virtual Reality) device, a device associated with 5G network services, etc.

17 Claims, 7 Drawing Sheets

(51) Int. Cl.
*G08G 1/0968* (2006.01)
*G06Q 10/02* (2012.01)
*G08G 1/133* (2006.01)

(52) U.S. Cl.
CPC ......... *G06T 7/20* (2013.01); *G08G 1/096833* (2013.01); *G08G 1/133* (2013.01); *G06T 2207/20084* (2013.01); *G06T 2207/30201* (2013.01); *G06T 2207/30252* (2013.01)

METHOD AND APPARATUS FOR PASSENGER RECOGNITION AND BOARDING SUPPORT OF AUTONOMOUS VEHICLE

CROSS-REFERENCE TO RELATED APPLICATION

This application claims benefit of priority to Korean Patent Application No. 10-2019-0104497, filed on Aug. 26, 2019, the entire disclosure of which is incorporated herein by reference in its entirety.

BACKGROUND

1. Technical Field

The present disclosure relates to a method and apparatus for passenger recognition and boarding/alighting support of an autonomous vehicle and, more particularly, a method and apparatus for passenger recognition and boarding/alighting support of an autonomous vehicle, the method and an apparatus calculating the number of scheduled passengers and safely supporting boarding of the passengers, using a passenger candidate group extracted by analyzing information and images of scheduled passengers input through a terminal.

2. Description of Related Art

Recently, interest in a drone, an electric vehicle, and artificial intelligence are increasing with development of the high technology and IT industry. Further, a lot of interest and studies are being conducted on autonomous vehicles combining IT and automotive technology.

In general, an autonomous vehicle means a vehicle that can autonomously run to a set destination by recognizing surrounding objects such as roads, vehicles, and pedestrians even without operation by a driver.

Such an autonomous vehicle is an aggregate of the artificial intelligence vehicle technology and is a vehicle that can automatically run to a set destination even without a driver or operation by a driver, so a function that automatically checks whether scheduled passenger can board, checks the number of scheduled passengers, and safely and accurately support boarding/alighting even without a driver, a guide, a safety supervisor is considered as an important function.

Korean Patent Application No. 2016-0150442 has disclosed an autonomous vehicle that stops a first destination corresponding to the location of a terminal by receiving the location of the terminal, checks whether autonomous driving conditions are satisfied when a user of the terminal boards at the first destination, and then performs autonomous driving to a second destination.

However, Korean Patent Application No. 2016-0150442 does not consider checking the number and boarding availability of scheduled passengers at a stop and users (a passenger candidate group) who want to board at a stop even though they do not have a reservation, so a problem may be generated with the autonomous vehicle when passengers board/alight at a stop.

That is, it is required as one of important functions of autonomous vehicles to simultaneously provide boarding availability and safe and accurate boarding guide for passengers on the basis of the point in time when the autonomous vehicles are stopped.

RELATED ART DOCUMENTS

Patent Documents

Related Art: Korean Patent Application No. 10-2016-0150442

SUMMARY OF THE INVENTION

The present disclosure has been made in an effort to solve the problems and an aspect of the present disclosure is to provide an apparatus for passenger recognition and boarding/alighting support of an autonomous vehicle, wherein the apparatus calculates the number of reserved passengers at an appointed stop place using a passenger candidate group extracted by analyzing scheduled passenger information and images of people outside the vehicle that are input through a terminal.

An apparatus for passenger recognition and boarding/alighting support of an autonomous vehicle according to an embodiment of the present disclosure may include: a vehicle communicator configured to receive scheduled passenger information about a scheduled passenger from a user terminal or a stop terminal on the basis of a downlink grant (DL grant); a sensor configured to sense people within a predetermined area outside a vehicle on the basis of an appointed stop place; and a vehicle controller configured to extract a passenger candidate group by analyzing the people outside the vehicle sensed by the sensor, and calculate the number of reserved passengers using the extracted passenger candidate group and the received scheduled passenger information.

Further, in an embodiment of the present disclosure, the vehicle controller may extract the passenger candidate group by analyzing at least one of faces, motions, and movement directions of the people sensed in the predetermined area outside the vehicle.

Further, in an embodiment of the present disclosure, the vehicle controller may compare the faces of people pertaining to the passenger candidate group and face pictures in the scheduled passenger information, and calculate the number of matched people, and then calculate the number of reserved passengers by subtracting the calculated number of people from the sum of the number of the people in the passenger candidate group and the number of scheduled passengers.

Further, in an embodiment of the present disclosure, the vehicle controller may determine passenger types on the basis of at least one of faces, body shapes, walks, and belongings of the people pertaining to the reserved passengers, and may determine a stop position of the vehicle on the basis of a position of a passenger pertaining to the mobility handicapped.

Further, in an embodiment of the present disclosure, the vehicle controller may determine boarding standby time of the vehicle on the basis of the number of the reserved passengers, and may divide the predetermined area into several sections on the basis of separation distances with respect to the appointed stop place, and differently adjust the boarding standby time in accordance with sections where the reserved passengers exist of the several sections.

Further, in an embodiment of the present disclosure, the vehicle controller may determine the passenger types of the reserved passengers on the basis of at least one of faces, body shapes, walks, and belongings of the people outside the vehicle, and may readjust the adjusted boarding standby time or adjust the separation distances for discriminating sections where expectant passengers exists, on the basis of the passenger types of the reserved passengers.

Further, in an embodiment of the present disclosure, the vehicle controller may divide the predetermined area into several sections on the basis of separation distances with respect to the appointed stop place, may determine the passenger candidate group existing in a section closest to the appointed stop place of the several sections as first fixed passengers, may determine expectant passengers as second fixed passengers, and may calculate the fixed passengers obtained by subtracting duplicate people from the sum of the number of the first fixed passengers and the second fixed passengers as the reserved passengers.

Further, in an embodiment of the present disclosure, the vehicle controller may run the vehicle by selecting one of a fixed route running mode and a flexible route running mode by reflecting passenger demand information and driving area information, and the passenger demand information may be determined using a deep neural network model trained in advance with scheduled passenger information and passenger information of the autonomous vehicle for each day and time band.

Further, in an embodiment of the present disclosure, the vehicle controller may stop the vehicle at every predetermined stop on a determined route when the fixed route running mode is selected, may stop the vehicle at stops where a passenger who will alight exists in the vehicle or where a reserved passenger exists, of predetermined stops on the predetermined route, and may stop the vehicle at a point, where there is a call for stopping the vehicle from the user terminal or the stop terminal, on the predetermined route, when the flexible route running mode is selected.

Further, in an embodiment of the present disclosure, when the vehicle stops for a passenger to board or alight, the appointed stop place may be a point where an inlet/outlet door of the vehicle is disposed, and the sensor may sense people outside the vehicle within a predetermined area on the basis of the inlet/outlet door.

Further, in an embodiment of the present disclosure, the apparatus may further include an external display configured to provide driving information to people outside the vehicle, and the vehicle controller may determine whether to stop the vehicle and boarding standby time at the appointed stop place in accordance with the calculated number of the reserved passengers, may display whether to stop the vehicle and the boarding standby time through the external display, and then may extract again the passenger candidate group by analyzing at least one of faces, motions, and movement directions of the people sensed by the sensor in the predetermined area.

Further, in an embodiment of the present disclosure, the vehicle communicator may perform a procedure of initial access to a 5G network on the basis of an SSB (synchronization signal block).

A method for passenger recognition and boarding/alighting support of an autonomous vehicle according to an embodiment of the present disclosure may include: receiving scheduled passenger information about a scheduled passenger from a user terminal or a stop terminal on the basis of a downlink grant (DL grant); sensing people within a predetermined area outside a vehicle on the basis of an appointed stop place; extracting a passenger candidate group by analyzing the sensed people outside the vehicle; and calculating the number of reserved passengers using the extracted passenger candidate group and the received scheduled passenger information.

Further, in an embodiment of the present disclosure, the extracting of a passenger candidate group may include extracting the passenger candidate group by analyzing at least one of faces, motions, and movement directions of the people sensed in the predetermined area outside the vehicle.

Further, in an embodiment of the present disclosure, the calculating of the number of reserved passengers may include: comparing the faces of people pertaining to the passenger candidate group and the face pictures in the scheduled passenger information and calculating the number of matched people; and calculating the number of reserved passengers by subtracting the calculated number of people from the sum of the number of the people in the passenger candidate group and the number of scheduled passengers.

Further, in an embodiment of the present disclosure, the method may further include: determining boarding standby time of the vehicle on the basis of the number of the reserved passengers, and dividing the predetermined area into several sections on the basis of separation distances with respect to the appointed stop place, and differently adjusting the boarding standby time in accordance with sections where the reserved passengers exist of the several sections.

Further, in an embodiment of the present disclosure, the method may further include: determining the passenger types of the reserved passengers on the basis of at least one of faces, body shapes, walks, and belongings of the people outside the vehicle; and readjusting the adjusted boarding standby time or adjusting the separation distances for discriminating sections where expectant passengers exists, on the basis of the passenger types of the reserved passengers.

Further, in an embodiment of the present disclosure, the method may further include running the vehicle by selecting one of a fixed route running mode and a flexible route running mode by reflecting passenger demand information and driving area information, and the passenger demand information may be determined using a deep neural network model trained in advance with scheduled passenger information and passenger information of the autonomous vehicle for each day and time band.

Further, a server for passenger recognition and boarding/alighting support of an autonomous vehicle according to an embodiment of the present disclosure may include: a receiver that receives scheduled passenger information about a scheduled passenger at an appointed stop place from a user terminal or a stop terminal, receives sensing information generated by sensing a person in a predetermined area on the basis of the appointed stop place from the autonomous vehicle; and a processor that extracts a passenger candidate group from the sensing information and calculates the number of reserved passengers using the extracted passenger candidate group and the scheduled passenger information.

In an embodiment of the present disclosure, the processor may determine boarding standby time of the autonomous vehicle on the basis of the number of reserved passengers, and may transmit the boarding standby time to the autonomous vehicle through a transmitter.

An apparatus for passenger recognition and boarding/alighting support of an autonomous vehicle according to an embodiment of the present disclosure can calculate the number of reserved passengers using scheduled passenger information input through a terminal and a passenger candidate group information extracted by analyzing people outside a vehicle sensed by a sensor.

Further, the apparatus for passenger recognition and boarding/alighting support of an autonomous vehicle according to an embodiment of the present disclosure can run by selecting one of a fixed route running mode and a flexible route running mode by reflecting passenger demand information and driving area information.

Further, the apparatus for passenger recognition and boarding/alighting support of an autonomous vehicle according to an embodiment of the present disclosure can provide boarding availability and safe and accurate boarding guide for passengers on the basis of the point in time when the autonomous vehicle are stopped.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
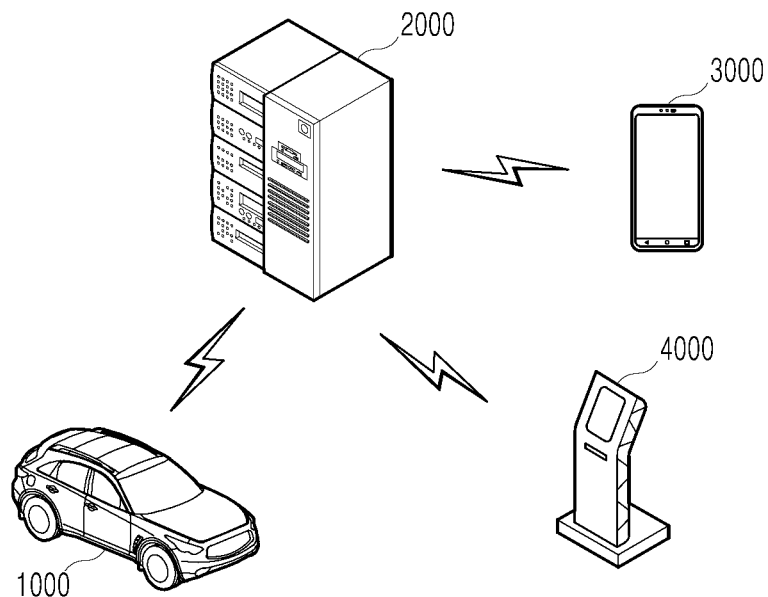
FIG. 1 is a diagram showing an apparatus for passenger recognition and boarding/alighting support of an autonomous vehicle according to an embodiment of the present disclosure.

Hereinafter, embodiments of the present disclosure will be described in detail with reference to the accompanying drawings.

Like reference numerals refer to the like elements throughout and a duplicate description thereof is omitted. In the following description, the terms "module" and "unit" for referring to elements are assigned and used exchangeably in consideration of convenience of explanation, and thus, the terms per se do not necessarily have different meanings or functions. In the following description of the embodiments disclosed herein, the detailed description of related known technology will be omitted when it may obscure the subject matter of the embodiments according to the present disclosure. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like, may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. The terms "connected" and "coupled" are not restricted to physical or mechanical connections or couplings, and can include electrical connections or couplings, whether direct or indirect.

The connection can be such that the objects are permanently connected or releasably connected.

As used herein, the singular forms "a," "an," and "the" may be intended to include the plural forms as well, unless the context clearly indicates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A vehicle described in this specification refers to a car, an automobile, and the like. Hereinafter, the vehicle will be exemplified as an automobile.

The vehicle described in the present specification may include, but is not limited to, a vehicle having an internal combustion engine as a power source, a hybrid vehicle having an engine and an electric motor as a power source, and an electric vehicle having an electric motor as a power source.

FIG. 1 is a diagram showing an apparatus for passenger recognition and boarding/alighting support of an autonomous vehicle according to an embodiment of the present disclosure.

Referring to FIG. 1, an apparatus for passenger recognition and boarding/alighting support of an autonomous vehicle may include a vehicle 1000, a server 2000, a user terminal 3000, a stop terminal 4000, etc.

The apparatus for passenger recognition and boarding/alighting support of an autonomous vehicle according to an embodiment of the present disclosure may include components other than the components shown in FIG. 1 and to be described below or may not include some of the components shown in FIG. 1 and to be described below.

The apparatus for passenger recognition and boarding/alighting support of an autonomous vehicle according to an embodiment of the present disclosure may be mounted on a vehicle 1000 having wheels rotated by a power source and a steering input device for adjusting a traveling direction. Here, the vehicle 1000 may be an autonomous vehicle.

The autonomous vehicle 1000 according to an embodiment of the present disclosure can receive scheduled passenger information input through the user terminal 3000 or the stop terminal 4000, senses people outside the vehicle using a sensor 1600, and extract a passenger candidate group using a result of analyzing the people outside the vehicle by a vehicle controller 1200.

Further, the apparatus for passenger recognition and boarding/alighting support of an autonomous vehicle may also be mounted on a server 2000.

The server 2000 according to an embodiment of the present disclosure may acquire scheduled passenger information input from the user terminal 3000 and/or the stop terminal 4000, and extract a passenger candidate group by analyzing people outside the vehicle by controlling the sensor 1600 of the vehicle through a network.

Further, the server 2000 can transmit information input through the user terminal 3000 or the stop terminal 4000 to the vehicle 1000 through a network.

Further, the server 2000 can exchange all the information related to driving of the vehicle such as driving information, a driving route, a vehicle state, and weather information with the autonomous vehicle 1000 through a network.

The user terminal 3000 may be a portable device such as a laptop computer, a mobile phone, a personal digital assistant (PDA), a smart phone, and a multimedia device, or a non-portable device such as a personal computer (PC) or a vehicle-mounted device.

The stop terminal 4000, which is a device installed at a stop and providing the information of the vehicle 1000, may be a device that enables a user who wants to board to make a reservation to board the vehicle 1000 or displays information such as information of the number of passengers, service information, and a service route of the vehicle.

That is, the apparatus for passenger recognition and boarding/alighting support of an autonomous vehicle may be operated through network communication of the autonomous vehicle 1000 and the server 2000, may be operated in a way of direct control by the server 2000, or may be operated directly by the vehicle controller 1200 in the vehicle to be described below.

Figure 2:
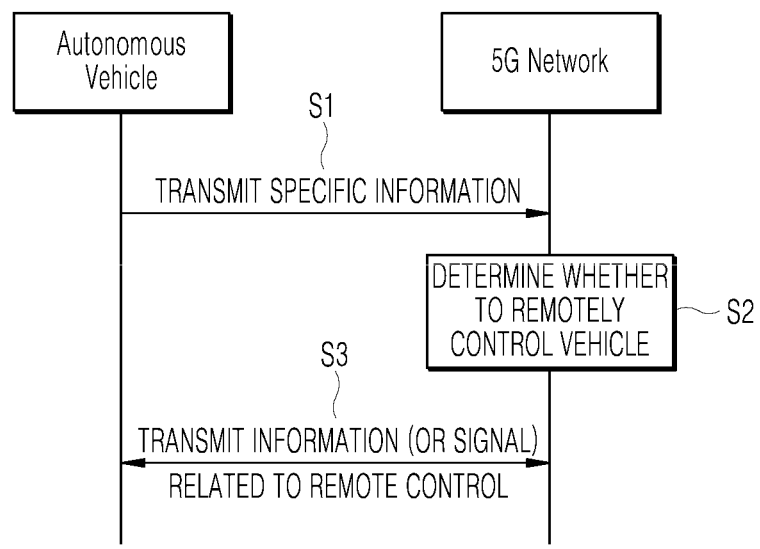
FIG. 2 is a diagram showing an example of the basic operation of an autonomous vehicle and a 5G network in a 5G communication system.

FIG. 2 is a diagram showing an example of the basic operation of an autonomous vehicle 1000 and a 5G network in a 5G communication system.

A system for passenger recognition and boarding/alighting support of an autonomous vehicle may be operated through network communication of the autonomous vehicle 1000 and the server 2000, which may be performed through a 5G network in a 5G communication system.

Referring to FIG. 2, the autonomous vehicle 1000 transmits specific information to a 5G network (S1).

The specific information may include autonomous driving related information.

The autonomous driving related information may be information directly related to the running control of the autonomous vehicle 1000. For example, the autonomous driving related information may include at least one of object data indicating an object around the vehicle, map data, vehicle state data, vehicle position data, and driving plan data.

The autonomous driving related information may further include service information necessary for autonomous driving. For example, the specific information may include information about a destination input through the user terminal 3000 or the stop terminal 4000, and a stability class of the vehicle.

In addition, the 5G network may determine whether the vehicle is remotely controlled (S2).

Here, the 5G network may include a server 2000 or a module that performs autonomous driving related remote control.

Here, the 5G network may transmit information (or signals) related to the remote control to the autonomous vehicle 1000 (S3).

As described above, the information related to the remote control may be a signal directly applied to the autonomous vehicle 1000, and may further include service information required for autonomous driving.

In one embodiment of the present disclosure, the autonomous vehicle 1000 can provide autonomous driving related services by receiving service information such as insurance and danger sector information selected on a route through a server 2000 connected to the 5G network.

That is, the autonomous vehicle 1000 can exchange vehicle state information, real-time road situation information, weather information, etc. with the server or can receive autonomous driving related information using a 5G network. Further, the autonomous vehicle 1000 can receive input information of the user terminal 3000 and/or the stop terminal 4000 through the server 2000 using a 5G network.

Figure 3:
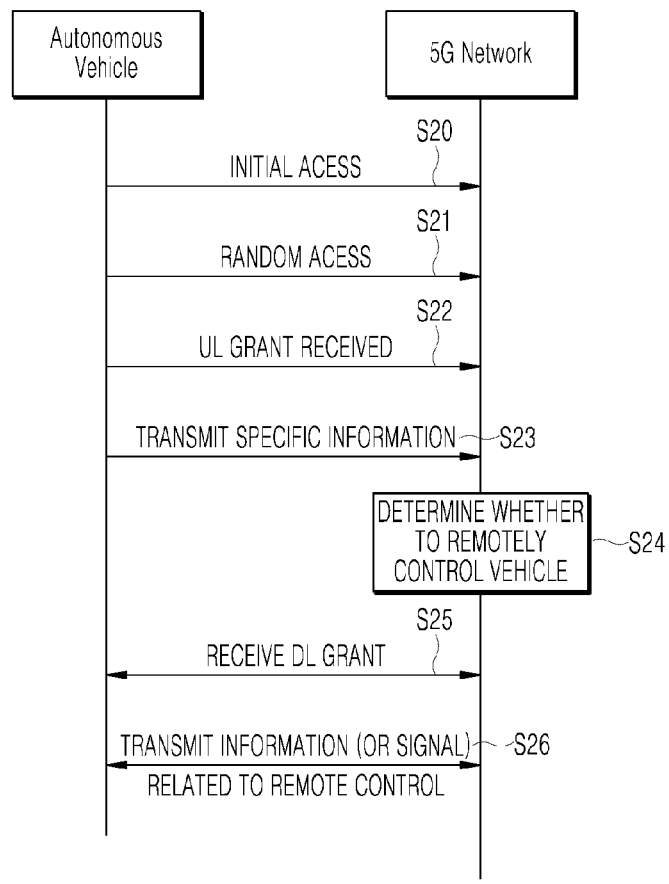
FIG. 3 is a diagram showing an example of an applied operation of an autonomous vehicle and a 5G network in a 5G communication system.

FIG. 3 is a diagram showing an example of an applied operation of an autonomous vehicle 1000 and a 5G network in a 5G communication system.

The autonomous vehicle 1000 performs an initial access procedure with the 5G network (S20).

Here, the initial access procedure includes cell search for acquiring a downlink (DL) operation, a process of acquiring system information, etc.

In addition, the autonomous vehicle 1000 performs a random access procedure with the 5G network (S21).

At this time, the random access procedure includes an uplink (UL) synchronization acquisition process or a preamble transmission process for UL data transmission, a random access response reception process, and the like.

Meanwhile, the 5G network transmits an uplink grant for scheduling transmission of specific information to the autonomous vehicle 1000 (S22).

Reception of the UL grant may include a process of receiving time/frequency resource scheduling for transmitting UL data to the 5G network.

Further, the autonomous vehicle 1000 transmits the specific information to the 5G network on the basis of the UL grant (S23).

Further, the 5G network determines whether to remotely control the vehicle (S24).

In addition, the autonomous vehicle 1000 may receive the DL grant through a physical downlink control channel in order to receive a response to specific information transmitted from the 5G network (S25).

Further, the 5G network transmits information (or a signal) related to remote control to the autonomous vehicle 1000 on the basis of the DL grant (S26).

The 5G network that is used in FIGS. 2 and 3 may be used as a meaning that includes the server 2000 connected with the 5G network.

Meanwhile, although an example of a combination of the initial access process and/or the random access process and the downlink grant reception process of 5G communication with the autonomous vehicle 1000 was described through the processes of S20 to S26 with reference to FIG. 3, the present disclosure is not limited thereto.

For example, the initial access process and/or the random access process may be performed through the processes S20, S22, S23, and S24. Further, for example, the initial access process and/or the random access process may be performed through the processes S21, S22, S23, S24, and S26. Further, a process of combining an AI operation and the downlink grant reception process may be performed through the processes S23, S24, S25, and S26.

Further, the operation of the autonomous vehicle 1000 was exemplified through the processes S20 to S26 with reference to FIG. 3, and the present disclosure is not limited thereto.

For example, the operation of the autonomous vehicle may be performed selectively in combination with the steps S20, S21, S22, S25 with the steps S23, and S26, and for example, the operation of the autonomous vehicle may be composed of S21, S22, S23, and S26. Further, for example, the operation of the autonomous vehicle 1000 may be composed of S20, S21, S23, and S26. Further, for example, the operation of the autonomous vehicle 1000 may be composed of S22, S23, S25, and S26.

Figure 4:
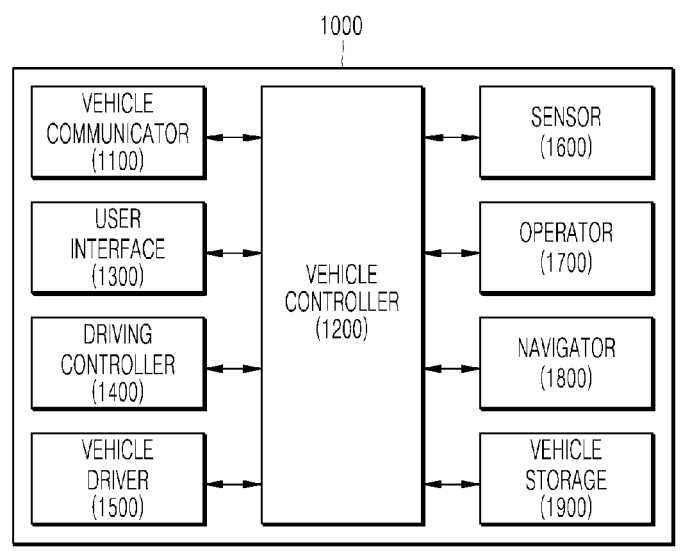
FIG. 4 is a block diagram of an autonomous vehicle according to an embodiment of the present disclosure.

FIG. 4 is a block diagram of an autonomous vehicle 1000 according to an embodiment of the present disclosure.

Referring to FIG. 4, the autonomous vehicle 1000 may include a vehicle communicator 1100, a vehicle controller 1200, a user interface 1300, a vehicle driver 1400, a driving controller 1500, a sensor 1600, an operator 1700, a navigator 1800, and a vehicle storage 1900.

The apparatus for passenger recognition and boarding/alighting support of an autonomous vehicle according to an embodiment of the present disclosure may include components other than the components shown in FIG. 4 and to be described below or may not include some of the components shown in FIG. 4 and to be described below.

The autonomous vehicle 1000 may be switched from an autonomous mode to a manual mode, or switched from the manual mode to the autonomous mode depending on the driving situation. The driving status may be determined based on at least one among information received through the vehicle communicator 1100, external object information detected by an object detection module (not shown), or navigation information obtained by the navigator 1800.

The autonomous vehicle 1000 may be switched from the autonomous mode to the manual mode, or from the manual mode to the autonomous mode, according to a user input received through the user interface 1300.

The mode of the autonomous vehicle 1000 may be changed from the manual mode to the autonomous driving mode, or from the autonomous driving mode to the manual mode, based on information, data, and signals provided from an external device such as the user terminal 3000.

When the autonomous vehicle 1000 is operated in the autonomous driving mode, the autonomous vehicle 1000 may be operated under the control of the operator 1700 that controls driving, parking, and unparking. When the autonomous vehicle 1000 is operated in the manual mode, the autonomous vehicle 1000 may be operated by an input of a driver's mechanical driving operation through the driving controller 1500.

The vehicle communicator 1100 may be a module for performing communication with an external device. Here, the external device may be another vehicle, the server 2000, the user terminal 3000, or the stop terminal 4000.

The vehicle communicator 1100 according to an embodiment of the present disclosure can receive scheduled passenger information on the basis of a downlink grant (DL grant).

That is, the vehicle communicator 1100, in order to receive a response to specific information from 5G network, can receive a DL grant through a physical downlink control channel and can receive scheduled passenger information input through an external terminal such as user terminal 3000 and/or the stop terminal 4000 on the basis of the DL grant.

Here, the scheduled passenger information, which is information input through the user terminal 3000 and/or the stop terminal 4000, may mean user information that people who want to board input to make a reservation to board through the terminals 3000 and 4000.

For example, a boarding aspirant wants to board the autonomous vehicle 1000, he/she can input desired boarding information, that is, scheduled passenger information such as his/her name, face picture, belongings, personal ID number, an appointed boarding place, an appointed alighting place, and a desired boarding time through the user terminal 3000 and/or the stop terminal 4000.

In detail, referring to FIG. 3 described above, the vehicle communicator 1100 can perform the procedure of initial access to a 5G network and the procedure of random access to the 5G network on the basis of an SSB (synchronization signal block) (S21). Next, the 5G network can transmit a UL grant for scheduling transmission of specific information to the autonomous vehicle (S22), the autonomous vehicle 1000 can transmit specific information to the 5G network on the basis of the UL grant (S23), the 5G network can determine whether to remotely control the vehicle (S24), the autonomous vehicle can receive a DL grant through a physical downlink control channel to receive a response to the specific information from the 5G network (S25), and the 5G network can receive information (signal) related to remote control, scheduled passenger information input through the external terminals 3000 and 4000, etc. from the autonomous vehicle 1000 on the basis of the DL grant (S26).

The vehicle communicator 1100 may include at least one among a transmission antenna, a reception antenna, a radio frequency (RF) circuit capable of implementing various communication protocols, and an RF element in order to perform communication.

The vehicle communicator 1100 may include a short range communication module, a position information module, a V2X communication module, an optical communication module, a broadcast transmission/reception module, and an Intelligent Transport Systems (ITS) communication module.

Depending on the embodiment, the vehicle communicator 1100 may further include modules other than the modules to be described, or may not include some of the modules to be described.

The vehicle communicator 1100 may support short-range communication by using at least one among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, and Wireless Universal Serial Bus (Wireless USB) technologies.

The vehicle communicator 1100 may form short-range wireless communication networks so as to perform short-range communication between the vehicle 1000 and at least one external device.

The vehicle communicator 1100 may include a Global Positioning System (GPS) module or a Differential Global Positioning System (DGPS) module for obtaining location information of the autonomous vehicle 1000.

The vehicle communicator 1100 may include a module for supporting wireless communication between the autonomous vehicle 1000 and a server (V2I: vehicle to infrastructure), communication with another vehicle (V2V: vehicle to vehicle) or communication with a pedestrian (V2P: vehicle to pedestrian). That is, the vehicle communicator 1100 may include a V2X communication module. The V2X communication module may include an RF circuit capable of implementing V2I, V2V, and V2P communication protocols.

The vehicle communicator 1100 may include an optical communication module for performing communication with an external device via light. The optical communication module may include a light transmitting module for converting an electrical signal into an optical signal and transmitting the optical signal to the outside, and a light receiving module for converting the received optical signal into an electrical signal.

The light transmitting module may be formed to be integrated with the lamp included in the autonomous vehicle 1000.

The vehicle communicator 1100 may include a broadcast communication module for receiving broadcast signals from an external broadcast management server, or transmitting broadcast signals to the broadcast management server through broadcast channels. The broadcast channel may include a satellite channel and a terrestrial channel. Example of the broadcast signal may include a TV broadcast signal, a radio broadcast signal, and a data broadcast signal.

The vehicle communicator 1100 may include an ITS communication module that exchanges information, data or signals with a traffic system. The ITS communication module may provide the obtained information and data to the traffic system. The ITS communication module may receive information, data, or signals from the traffic system. For example, the ITS communication module may receive road traffic information from the communication system and provide the road traffic information to the vehicle controller 1200. For example, the ITS communication module may receive control signals from the traffic system and provide the control signals to the vehicle controller 1200 or a processor provided in the autonomous vehicle 1000.

Depending on the embodiment, the overall operation of each module of the vehicle communicator 1100 may be controlled by a separate process provided in the vehicle communicator 1100. The vehicle communicator 1100 may include a plurality of processors, or may not include a processor. When a processor is not included in the vehicle communicator 1100, the vehicle communicator 1100 may be operated by either a processor of another apparatus in the autonomous vehicle 1000 or the vehicle controller 1200.

The vehicle communicator 1100 may, together with the user interface 1300, implement a vehicle-use display device. In this case, the vehicle-use display device may be referred to as a telematics device or an audio video navigation (AVN) device.

The vehicle communicator 1100 may transmit specific information over a 5G network when the autonomous vehicle 1000 is operated in the autonomous driving mode.

The specific information may include autonomous driving related information.

The autonomous driving related information may be information directly related to the running control of the vehicle. For example, the autonomous driving related information may include at least one of object data indicating an object around the vehicle, map data, vehicle state data, vehicle position data, and driving plan data.

The autonomous driving related information may further include service information necessary for autonomous driving. For example, the specific information may include information about the destination and the stability level of the vehicle, which are inputted through the user terminal 3000 or a station terminal 4000.

In addition, the 5G network may determine whether a vehicle is to be remotely controlled.

Here, the 5G network may include a server 2000 or a module that performs autonomous driving related remote control.

The 5G network may transmit information (or a signal) related to the remote control to an autonomous vehicle 1000.

As described above, the information related to the remote control may be a signal directly applied to the autonomous vehicle 1000, and may further include service information required for autonomous driving.

The vehicle controller 1200 according to an embodiment of the present disclosure can extract a passenger candidate group by analyzing people outside the vehicle sensed through the sensor 1600.

That is, the vehicle controller 1200 can sense people in a predetermined area outside the vehicle by controlling the sensor 1600 and can and extract a passenger candidate group by analyzing the sensed people outside the vehicle.

Figure 5A:
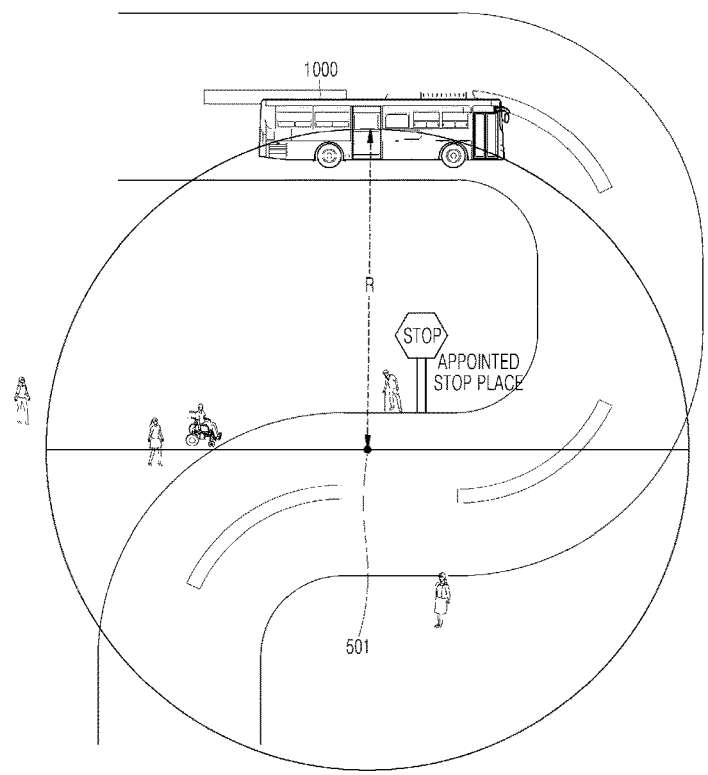
FIG. 5A is a diagram showing a case in which an apparatus for passenger recognition and boarding/alighting support of an autonomous vehicle according to an embodiment of the present disclosure extracts a passenger candidate group by analyzing external people sensed in a predetermined area through a sensor.

FIG. 5A is a diagram showing a case in which the vehicle controller 1200 according to an embodiment of the present disclosure extracts a passenger candidate group by analyzing external people sensed in a predetermined area through the sensor 1600.

Referring to FIG. 5A, the vehicle 1000 can sense external people in a predetermined area through the sensor 1600 from the point in time when the distance from a predetermined reference point 501 (e.g., an appointed stop place or a stop) enters into a predetermined distance R. The predetermined area may be set as a range within the predetermined distance R from the reference point 501. Here, the predetermined distance R may be set differently, depending on various conditions such as the sensing range of the sensor 1600, the degree of securing a visual field to an appointed stop place of the vehicle 1000, weather, time (day/night), and the traffic situation of a road.

Further, when the vehicle 1000 arrives at the reference point 501, the predetermined area may be set as a range within the predetermined distance R from the point where an inlet/outlet door is disposed.

For example, when the vehicle 1000 stops for passengers to board/alight, the appointed stop place may be the point where the inlet/outlet door is disposed. At this time, the sensor 1600 can sense people in a predetermined area outside the vehicle on the basis of the inlet/outlet door.

The sensor 1600 can measure the distance of each of external people outside from the inlet/outlet door of the vehicle 1000 using a lidar (not shown) and/or a radar (not shown), and can photograph the people within the predetermined range R outside the vehicle 1000 through an external camera (not shown) or can sense people outside the vehicle 1000 through communication (a 5G network, Bluetooth, etc.) with terminals that the external people have.

Accordingly, the vehicle controller 1200 can extract a passenger candidate group through actions, positions, and communication with terminals of external people sensed within a predetermined area by the sensor 1600.

The vehicle controller 1200 according to an embodiment of the present disclosure can extract a passenger candidate group by analyzing at least one of the faces, motions, and movement directions of people sensed in a predetermined area outside the vehicle.

For example, the vehicle controller 1200 photographs people in a predetermined area outside the vehicle through a camera by controlling the sensor 1600 and analyzes at least one of specific actions, such as the faces, motions, and movement directions of the photographed people, thereby being able to extract a passenger candidate group.

That is, the vehicle controller 1200 extracts feature such as the faces, motions, and movement directions at each frame of videos taken through an external camera (not shown) of the autonomous vehicle 1000 and classifies the features in common of the features through machine learning, thereby being able to extract a passenger candidate group.

For example, the vehicle controller 1200 may include a deep neural network model trained in advance. That is, the deep neural network model may be a deep neural network model trained in advance using features, which are extracted and found from specific actions, motions, movement directions, and facial expressions of a passenger candidate group, as training data.

For example, specific actions, faces, motions, movement directions, etc. in frames taken by a camera, for example, body gestures, hand gestures, actions, etc. for calling the vehicle 1000 or waiting may be the features for learning a deep neural network model. A hand gesture for stopping and waiting toward a vehicle, a hand gesture for calling a vehicle, a figure of running or quickly walking to a vehicle, and a tense expression toward a vehicle, etc. may be used as training data for extracting a passenger candidate group from a deep neural network model.

Accordingly, the vehicle controller 1200 can extract a passenger candidate group by analyzing at least one of the faces, motions, and movement directions of people outside the vehicle, using a deep neural network model trained in advance. At this time, the vehicle controller 1200 can check whether or not of a reservation of the passenger candidate group on the basis of scheduled passenger information input through the user terminal 3000 or the stop terminal 4000. That is, when face pictures in the scheduled passenger information and the faces of the passenger candidate group in a frame taken in a predetermined area by an external camera of the vehicle are matched, the vehicle controller 1200 can determine that the passenger candidate group has a reservation in advance. Here, the vehicle controller 1200 can determine not only a person who is matched with a face picture in the scheduled passenger information, but also a person who is not matched with the face pictures in the scheduled passenger information but conducts various actions (specific actions, motions, movement directions, and facial expressions of the passenger candidate group) as the passenger candidate group.

The vehicle controller 1200 does not perform determination on motions of scheduled passengers and may perform motion analysis only on people who are not scheduled passengers but positioned in the predetermined area.

Here, the movement directions of people outside the vehicle can be analyzed by taking a video through a camera, but may be analyzed through 5G communication, Bluetooth communication, and GPS position check with carried terminals.

Further, the vehicle controller 1200 analyzes the faces of external people sensed in the predetermined area, and when there is a previous record of boarding the autonomous vehicle 1000, the vehicle controller 1200 can extract the people as a passenger candidate group expected to board at this time too.

For example, when comparing face information of external people sensed through the sensor 1600 with scheduled passenger information acquired before, and determining that they are the same people, the vehicle controller 1200 can extract them as a passenger candidate group in consideration of the number of times of boarding, whether or not boarding at a specific time band, a boarding cycle, etc. using a deep neural network model.

The vehicle controller 1200 according to an embodiment of the present disclosure can calculate the number of reserved passengers using the extracted passenger candidate group and the received scheduled passenger information.

Here, the scheduled passenger information, which is information input through the user terminal 3000 and/or the stop terminal 4000, may mean user information that people who want to board input to make a reservation to board through the terminals 3000 and 4000.

For example, a boarding aspirant wants to board the autonomous vehicle 1000, he/she can input desired boarding information, that is, scheduled passenger information such as his/her name, face picture, belongings, individual ID number, a desired boarding place, a desired stop place, and a desired boarding time through the user terminal 3000 and/or the stop terminal 4000.

Accordingly, the vehicle controller 1200 can acquire scheduled passenger information input through the user terminal 3000 and/or the stop terminal 4000, using a network, and can calculate the number of reserved passengers, using the scheduled passenger information input and acquired through the terminals 3000 and 4000 and the information of the passenger candidate group extracted using the deep neural network model trained in advance.

In other words, the vehicle controller 1200 can calculate the number of reserved passengers, using the scheduled passenger information input through an external terminal, for example, the user terminal 3000 and/or the stop terminal 4000, and the information of the passenger candidate group extracted using the deep neural network model trained in advance. At this time, the vehicle controller 1200 compares the faces of people pertaining to the passenger candidate group and the face pictures in the scheduled passenger information, and calculates the number of matched people, and can calculate the number of reserved passengers by subtracting the calculated number of people from the sum of the number of the people in the passenger candidate group and the number of scheduled passengers.

Thereafter, the vehicle controller 1200 can determine boarding standby time of the vehicle (e.g., time corresponding to the range to which the number of reserved passengers pertains) on the basis of the number of reserved passengers, or can determine a set time as the boarding standby time. At this time, the vehicle controller 1200, for example, can check the range to which the number of reserved passengers pertains and determine time corresponding to the checked range as boarding standby time, or can determine boarding standby time in proportion to the number of reserved passengers. When the number of reserved passengers is seven, the vehicle controller 1200 can determine 2 min corresponding to the range of 5 to 10 people as boarding standby time.

Figure 5B:
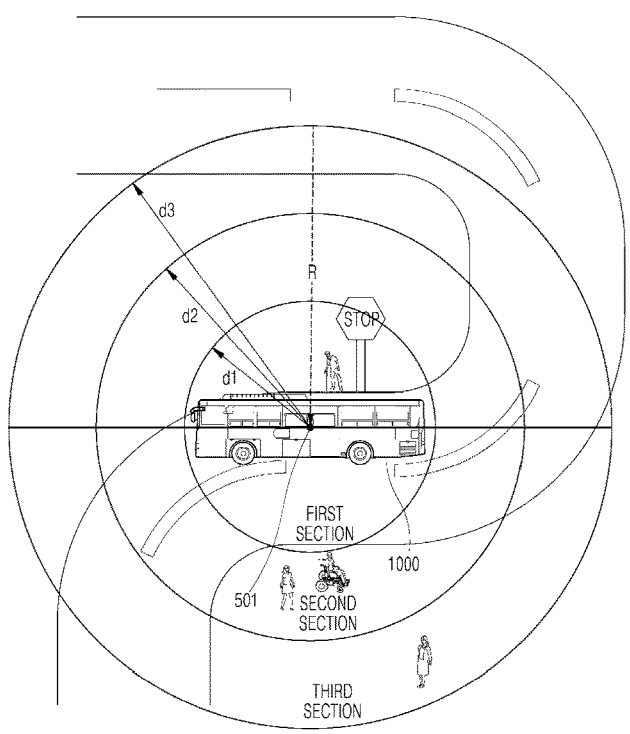
FIG. 5B is a diagram illustrating an example in which an apparatus for passenger recognition and boarding/alighting support of an autonomous vehicle according to an embodiment of the present disclosure determines boarding standby time of the vehicle in accordance with sections in a predetermined area.

Meanwhile, the vehicle controller 1200, as shown in FIG. 5B, can divide the predetermined area into several sections (e.g., first to third sections) on the basis of separation distances $d_1$, $d_2$, and $d_3$ from a predetermined reference point 501 (e.g., an appointed stop place, a stop, the inlet/outlet door of the vehicle), and can differently adjust boarding standby time in accordance with sections where expectant passengers exist of the plurality of sections. At this time, when expectant passengers exist, the vehicle controller 1200 can adjust the boarding standby time to be longer for sections having longer separation distances.

For example, assuming that the closest section is a first section and the farthest section is a third section in a predetermined area on the basis of a point corresponding to the inlet/outlet door of the autonomous vehicle 1000, when a expectant passenger exists in the first section and the determined boarding standby time is 2 min, the vehicle controller 1200 can adjust the boarding standby time to 2 min and 20 sec by increasing the boarding standby time 20 sec (adjustment time corresponding to the first section), and when a reserved passenger exists in the third section and the determined boarding standby time is 2 min, the vehicle controller 1200 can adjust the boarding standby time to 3 min by increasing the boarding standby time 1 min (adjustment time corresponding to the third section).

Further, the vehicle controller 1200 can determine passenger types of expectant passengers on the basis of at least one of the faces, body shapes, walks, and belongings of the people outside the vehicle. At this time, the vehicle controller 1200 adjusts the determined boarding standby time (or, boarding standby time adjusted in accordance with each section) or adjusts the separation distances of the sections where expectant passengers exist on the basis of the determined passenger types (e.g., a patient, an old person, a child, a pregnant woman, and a general person) of the reserved passengers, thereby being able to adjust boarding standby time in accordance with changes of the sections where expectant passengers exist.

When adjusting boarding standby time on the basis of passenger types, the vehicle controller 1200 can adjust the determined boarding standby time on the basis of predetermined additional boarding time for passenger types. For example, in a case in which expectant passengers exist in the first section, the second section, and the third section and the boarding standby time has been set as 2 min 20 sec, 2 min 40 sec, and 3 min on the basis of a predetermined reference, if a reserved passenger existing in the first section is an old person, the vehicle controller 1200 can adjust the boarding standby time (2 min 20 sec) to 2 min 40 sec by increasing the boarding standby time by 20 sec that is the additional boarding time for old people.

Further, when changing section on the basis of passenger types, the vehicle controller 1200 can adjust the separation distances $d_1$, $d_2$, and $d_3$ for each set section from a predetermined reference point on the basis of the positions of expectant passengers. For example, when determining separation distances for sections, which are the references for discriminating the first section, second section, and third section, as 2 m, 3 m, and 5 m in accordance with a predetermined reference, and when the passenger type of a reserved passenger existing in the second section is a patient, the vehicle controller 1200 adjusts the existing separation distance (3 m) of the second section to 2.4 on the basis of the position (2.5 m) of the patient so that the patient can exist in the third section, thereby being able to increase boarding standby time from 2 min 30 sec (the boarding standby time corresponding to the second section) to 3 min (the boarding standby time corresponding to the third section).

Further, the vehicle controller 1200 can compare the number of reserved passengers existing a predetermined area and a predetermined number of people (e.g., the capacity of the vehicle 1000), and can adjust the boarding standby time at each section in the predetermined area or can adjust the separation distances that are the references for discriminating the sections on the basis of the comparison result above. For example, when the number of reserved passengers existing in a predetermined area is smaller than a predetermined number of people, the vehicle controller 1200 can increase the boarding standby time at each section or the separation distance for each section in proportion to the difference of the numbers of people or by a predetermined value.

Further, the vehicle controller 1200 determines fixed passengers on the basis of the passenger candidate group and the scheduled passenger information and calculates the number of reserved passengers on the basis of the fixed passengers, thereby being able to check the number of passengers to actually board the vehicle. At this time, the vehicle controller 1200, for example, can divide the predetermined area into several sections on the basis of separation distances with respect to an appointed stop place, and can determine only the passenger candidate group existing in the closest section from the appointed stop place (first section) of the several section as first fixed passengers. Further, the vehicle controller 1200 can determine expectant passengers included in the scheduled passenger information as second fixed passengers and can calculate the fixed passengers obtained by subtracting duplicate people from the sum of the number of the first fixed passengers and the second fixed passengers as the reserved passengers. Here, when the face pictures in scheduled passenger information input through the user terminal 3000 or the stop terminal 4000 and the faces pertaining to a passenger candidate group photographed in a predetermined area by an external camera (not shown) of the autonomous vehicle 1000 are matched, the vehicle controller 1200 can determine the people with the faces as duplicate people.

That is, when a passenger candidate groups exist in the first section, the vehicle controller 1200 can determine the passenger candidate group existing in the first section as fixed passengers even if they do not make a reservation in advance. On the other hand, when a passenger candidate group has made a reservation in advance, the vehicle controller 1200 can determine the passenger candidate group having made a reservation as fixed passengers regardless sections having a passenger candidate group. That is, the vehicle controller 1200 can determine all the reserved passenger candidate groups existing in the first section, the second section, and the third section as fixed passengers.

At this time, when a passenger candidate group having made a reservation comes out of the third section and is located within a predetermined distance range from the third section, the vehicle controller 1200 can adjust the separation distance of the third section to include the passenger candidate group having a reservation.

Meanwhile, the vehicle controller 1200 can calculate the number of reserved passengers using scheduled passenger information and the information of a passenger candidate group, and can distribute seat in accordance with priority when determining that the entire passengers in the vehicle exceeds the capacity of the vehicle 1000 on the basis of the number of people who will alight when stopping at a stop (expected stop place), the number of reserved passengers, and the passengers in the existing vehicle.

For example, it is possible to distribute seats in a way of giving priory to patients, old people, and children of the passengers who made a reservation through the terminals 3000 and 4000 in advance (passengers included in scheduled passenger information) and a passenger candidate group and of giving the next priority to passenger candidate groups except for the patient, the old people, and the children.

Further, when it is impossible to accommodate passengers who have made a reservation through the terminals 3000 and 4000 in advance (passengers included in scheduled passenger information) due to excess over the capacity, the vehicle controller 1200 can inform the user terminals of the next vehicle using the previously acquired scheduled passenger information, or can display the current accommodation state (e.g., the number of existing passengers to the capacity of the vehicle) through the display 1340 mounted on the outer side of the vehicle.

Figure 6A:
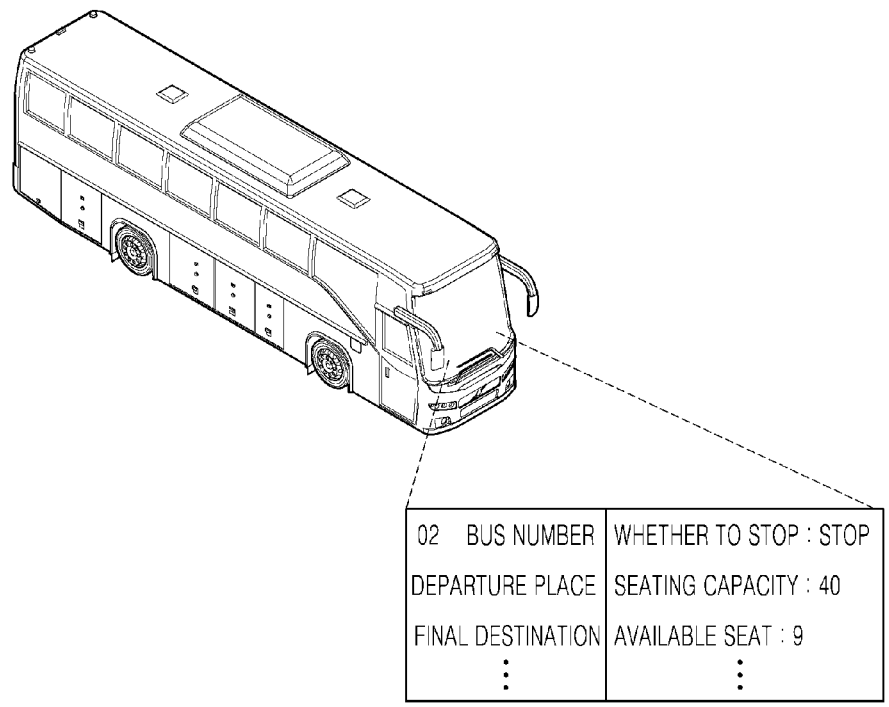
FIG. 6A is a diagram illustrating an example in which an apparatus for passenger recognition and boarding/alighting support of an autonomous vehicle according to an embodiment of the present disclosure provides boarding guide information and service information of the vehicle.

Further, the vehicle controller 1200 can determine whether to stop the vehicle at the next appointed stop place, depending on the number of the reserved passengers. At this time, the vehicle controller 1200 can display boarding guide information, which includes at least one of vacant seats, boarding standby time, a seating capacity (accommodation amount, number of accommodation persons), and the current accommodation amount state (e.g., the number of existing passengers), together with the whether to stop the vehicle to the outside of the vehicle through the display 1340, as shown in FIG. 6A. Further, the vehicle controller 1200 can further display running information including the vehicle number, the departure place, the destination, etc. through the display 1340.

When determining whether to stop the vehicle, the vehicle controller 1200 can determine to 'pass' (not to stop) when determining there is neither a person who will alight nor expectant passenger, or when determining there is no person who will alight, but the passengers in the vehicle exceeds the capacity of the vehicle.

After displaying at least one of the current accommodation amount state, whether to stop the vehicle, and boarding standby time, the vehicle controller 1200 can extract again the passenger candidate group by analyzing at least one of faces, motions, and movement directions of people sensed by the sensor 1600 in the predetermined area. For example, when determining there is neither a person who will alight nor expectant passenger, the vehicle controller 1200 can determine to pass about whether to stop the vehicle, display it on the display 1340, and extract again a passenger candidate group by analyzing sensing information of the sensor 1600. Further, when the number of existing passengers is smaller than the capacity of the vehicle, the vehicle controller 1200 changes the whether to stop the vehicle into 'stop', thereby being able to stop the vehicle at an appointed stop place.

Further, the vehicle controller 1200 can determine the stop position of the vehicle at the appointed stop place on the basis of the scheduled passenger information.

For example, when there is only scheduled passenger information input from the stop terminal 4000 and there is no scheduled passenger information input through the user terminal 3000, it is possible to determine the position of the input stop terminal 4000 as the stop position of the vehicle at the appointed stop place.

Further, when there is only scheduled passenger information input from the user terminal 3000 and there is no scheduled passenger information input through the stop terminal 4000, it is possible to determine the stop position of the vehicle around the appointed stop place in consideration of the position of the input user terminal 3000.

Further, when there are both scheduled passenger information input from the user terminal 3000 and scheduled passenger information input through the stop terminal 4000, the vehicle controller 1200 may set both of a position corresponding to the user terminal 3000 and a position corresponding to the stop terminal 4000 as the stop position of the vehicle at the appointed stop place, and may set any one of the two positions as the stop position of the vehicle at the appointed stop place when the position corresponding to the user terminal 3000 and the position corresponding to the stop terminal 4000 are positioned close to each other.

Further, the vehicle controller 1200 according to an embodiment of the present disclosure can determine the passenger types of expectant passengers by analyzing scheduled passenger information and an image of an extracted passenger candidate group, and can determine the stop position of the vehicle at an appointed stop place on the basis of the position of a passenger who pertains to the mobility handicapped (e.g., a pregnant woman, a patient, an old person, and a child).

For example, a boarding aspirant inputs his/her belongings, for example, whether he/she has a wheelchair, a baby carriage, etc. through the user terminal 3000 and/or the stop terminal 4000, whether he/she has a wheelchair, a baby carriage, etc. is included in scheduled passenger information and can be transmitted to the vehicle controller 1200. The vehicle controller 1200 can determine the passenger types of scheduled passenger from the scheduled passenger information input through the user terminal 3000 and/or the stop terminal 4000, or can determine passenger types on the basis of the faces, body shapes, walks, and belongings of people who pertain to a passenger candidate group (or boarding expectant) extracted from an image taken through an external camera of the vehicle.

The vehicle controller 1200 calculates a distance that can minimize a boarding distance and determines a stop position of the vehicle for boarding support on the basis of the position of a passenger who pertains to the mobility handicapped, thereby boarding easy. For example, when determined that a passenger type is a pregnant woman on the basis of scheduled passenger information, the vehicle controller 1200 can determine the stop position of the vehicle within a width smaller by a set value than a common distance width from a sidewalk where a patient is (e.g., reduces the distance width between the vehicle and the sidewalk from 1 mm to 20 cm). Further, for example, when an old person is extracted from an image taken through the external camera of the vehicle in a predetermined area, the vehicle controller 1200 can determine the stop position of the vehicle such that the inlet/outlet door is positioned within a predetermined range from the position where the old person exists.

Further, when determining that passengers may have difficulty in boarding, depending on the kinds of belongings (e.g., a wheelchair, a baby carriage), using scheduled passenger information and images of extracted passenger candidate groups, the vehicle controller 1200 can operate a foot plate for boarding support or can adjust the height of the vehicle 1000 to fit the height of the inlet/outlet door of the vehicle 1000 to the height of a sidewalk.

Further, the vehicle controller 1200 according to an embodiment of the present disclosure can determine the types of passengers in the vehicle using an image taken by an internal camera, and when a passenger type pertains to the mobility handicapped (e.g., a pregnant woman, a patient, an old person, and a child), similar to boarding, the vehicle controller 1200 can determine the stop position of the vehicle at an appointed stop place on the basis of the position of the passenger even in alighting.

Meanwhile, the vehicle controller 1200 according to an embodiment of the present disclosure can run the vehicle by selecting one of a fixed route running mode and a flexible route running mode by reflecting passenger demand information and driving area information.

For example, when the fixed route running mode is selected, even if there is not scheduled passenger information input from the user terminal 3000 and the stop terminal 4000 (there is no input (reservation) through a terminal), the vehicle controller 1200 can set a stop set in advance as the next appointed stop place, and move and stand by at the next appointed stop place when determining that passengers who intend to board without a reservation (passenger candidate group) may exist by reflecting passenger demand information and driving area information.

That is, even if there is no movement reservation of the autonomous vehicle 1000 through the terminals 3000 and 4000, when determining that it is an area where passengers are frequently generated or a populated area where movement of people frequently occurs, depending on time bands, by reflecting passenger demand information and driving area information, the vehicle controller 1200 can set even a stop without a reservation of the stop terminal 4000 as the next appointed stop place and run through a fixed route. In other words, when the fixed route running mode is selected, the vehicle controller 1200 can stop the vehicle at every predetermined stop on the determined route.

Further, when the flexible route running mode is selected, the vehicle controller 1200 can set a place corresponding to the terminals 3000 and 4000 where the next reservation exists as the next appointed stop place and can move when there is no input from the user terminal 3000 and the stop terminal 4000 and when determining that there would be no passenger by reflecting passenger demand information and driving area information.

For example, when determining that there is no input (reservation) from the external terminals 3000 and 4000 corresponding to the current position by reflecting passenger demand information and driving area information and there is no passenger in consideration of the use time band and the running area, the vehicle controller 1200 can set a flexible route, such as passing the stop corresponding to the current position as it is and then setting a position (place) corresponding to the terminals 3000 and 4000 where the next reservation exists as the next appointed stop place, and can run the vehicle 1000. In other words, the vehicle controller 1200 can stop the vehicle at stops where a passenger who will alight exists in the vehicle or where a reserved passenger exists, of predetermined stops on the predetermined route. Further, the vehicle controller 1200 stops the vehicle at a point, where there is a call for stopping the vehicle from the user terminal or the stop terminal, on the predetermined route, thereby being able to enable a passenger to board the vehicle at a desired position even if it is not a stop.

As a result, the vehicle controller 1200 can run the vehicle 1000 while selecting one of the fixed route running mode for running through a fixed route by reflecting passenger demand information and driving area information and a flexible route running mode for running by flexibly determining appointed stop places expected in consideration of whether there is input (reservation) from the terminals 3000 and 4000 and driving area information such as passenger demand information, a populated area, and a heavy traffic area depending on time bands.

For example, the autonomous vehicle 1000 can be run in the fixed route running mode for running through a fixed route during rush hour on weekdays to provide convenience for passengers and prevent passengers from confusing boarding/alighting places, and can be run in the flexible route running mode for running through a flexible route at time bands except for rush hour in consideration of whether there is input through the terminals 3000 and 4000, a traffic volume according to a time band, passenger demand information, etc.

Here, the passenger demand information can be determined using a deep neural network model trained in advance with scheduled passenger information input through the terminals 3000 and 4000 and passenger information of the autonomous vehicle for each day and time band.

That is, the vehicle controller 1200 can acquire passenger demand information from scheduled passenger information input through the terminals 3000 and 4000.

Further, the passenger information of the vehicle for each day and time band is trained using demand information of passengers who use the vehicle for each day and time band as a feature, using a deep neural network model, thereby being able to predict in advance demands of passengers who will use the vehicle for each day and time band.

That is, the vehicle controller 1200 estimates in advance demand information of passengers who use the vehicle for each day and time band, using scheduled passenger information input in advance through the terminals 3000 and 4000 and the deep neural network model trained in advance, thereby being able to sequentially setting appointed stop places where scheduled passengers are expected to exist, and to perform the flexible route running.

The vehicle controller 1200 may be implemented using at least one among application specific integrated circuits (ASICs), digital signal processors (DSPs), digital signal processing devices (DSPDs), programmable logic devices (PLDs), field [programmable gate arrays (FPGAs), processors, controllers, micro-controllers, microprocessors, and other electronic units for performing other functions.

Figure 7:
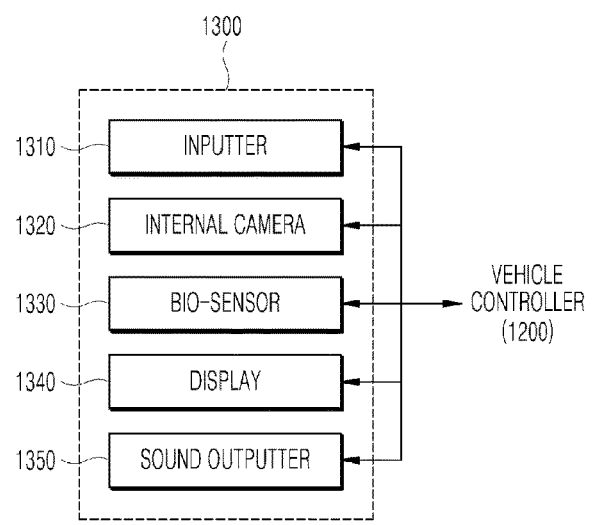
FIG. 7 is a block diagram showing a user interface of an autonomous vehicle.

FIG. 7 is a block diagram showing the user interface 1300 of the autonomous vehicle 1000.

Referring to FIG. 7, the user interface 1300 may allow interaction between the vehicle 1000 and a vehicle user, receive an input signal of the user, transmit the received input signal to the vehicle controller 1200, and provide information included in the vehicle 1000 to the user under the control of the vehicle controller 1200.

The user interface 1300 may include an inputter 1310, an internal camera 1320, a biometric sensor 1330, a display 1340 and a sound outputter 1350, but the present disclosure is not limited thereto.

The inputter 130 may receive information from a user, and data collected by the inputter 1310 may be analyzed by the vehicle controller 1200 and processed by a control command of the user.

The inputter 1310 may be disposed inside the vehicle. For example, the inputter 1310 may be disposed in one area of a steering wheel, one area of an instrument panel, one area of a seat, one area of each pillar, one area of a door, one area of a center console, one area of a head lining, one area of a sun visor, one area of a windshield, or one area of a window.

The inputter 1310 may include a voice input module, a gesture input module, a touch input module, and a mechanical input module.

The voice input module may convert a voice input of a user into an electrical signal. The electrical signal may be provided to the vehicle controller 1200.

The voice input module may include at least one microphone.

The gesture input module may convert a gesture input of a user into an electrical signal. The electrical signal may be provided to the vehicle controller 1200.

The gesture input module may include at least one of an infrared sensor for sensing a gesture input of the user or an image sensor.

According to an embodiment, the gesture input module may sense a three-dimensional gesture input of the user. The gesture input module may include a plurality of light outputters that output infrared light, or a plurality of image sensors.

The gesture input module may detect a user's three-dimensional gesture input using a time of flight (TOF) method, a structured light method, or a disparity method.

The touch input module may convert the touch input of the user into an electrical signal. The electrical signal may be provided to the vehicle controller 1200.

The touch input module may include a touch sensor for sensing the touch input of the user.

According to the embodiment, the touch input module may be integrally embodied with the display 1340 to realize a touch screen. The touch screen may provide an input interface and an output interface between the vehicle 1000 and the user.

The mechanical input module may include at least one among a button, a dome switch, a jog wheel, and a jog switch. An electrical signal generated by the mechanical input module may be provided to the vehicle controller 1200.

The mechanical input module may be disposed, for example, on a steering wheel, a center fascia, a center console, a cockpit module, or a door.

The internal camera 1320 may obtain an image of the interior of the vehicle. The vehicle controller 1200 may sense a user state based on the image of the interior of the vehicle. The vehicle controller 1200 may obtain gaze information of the user from the image of the interior of the vehicle of the vehicle. The vehicle controller 1200 may sense a gesture of the user from the image of the interior of the vehicle.

The biometric sensor 1330 may acquire biometric information of the user. The biometric sensor 1330 may include a sensor that can acquire biometric information of the user, and may acquire biometric information such as fingerprint information and heartbeat information of the user using the sensor. The biometric information may be used for user authentication.

The outputter may be configured to generate output related to sight, hearing, or touch, and may include at least one of the display 1340, the sound outputter 1350, and a haptic output module.

The display 1340 may display graphic objects corresponding to various information.

The display 1340 may include at least one of a liquid crystal display (LCD), a thin film transistor liquid crystal display (TFT LCD), an organic light emitting diode (OLED), a flexible display, a 3D display, or an e-ink display.

The display 1340 may form an interactive layer structure with a touch input module, or may be integrally formed with the touch input module to implement a touch screen.

The display 1340 may be implemented as a head up display (HUD). When the display 1340 is implemented as an HUD, the display 1340 may include a project module, and output information through an image projected onto a windshield or a window.

The display 1340 may include a transparent display. The transparent display may be attached to a windshield or a window.

The transparent display may display a predetermined screen with a predetermined transparency. In order to be transparent, the transparent display may include, for example, at least one among a transparent thin film electroluminescent (TFEL), a transparent organic light-emitting diode (OLED), a transparent liquid crystal display (LCD), a transmissive transparent display, and a transparent light emitting diode (LED). The transparency of the transparent display may be adjusted.

The user interface 1300 may include a plurality of display modules.

The display 1340 may be disposed in one area of the steering wheel, one area of the instrument panel, one area of the seat, one area of each pillar, one area of the door, one area of the center console, one area of the head lining, or one area of the sun visor, or may be implemented on one area of the windshield or one area of the window.

The display 1340 according to an embodiment of the present disclosure can display in real time the driving information and information about obstacles on the driving route of the autonomous vehicle 1000 for safety of passengers and pedestrians.

For example, the display 1340 may be mounted inside and outside of the autonomous vehicle 1000 (e.g., the front, sides, and rear of the vehicle) for safety and information provision of passengers and pedestrians (drivers of other vehicles).

Figure 6B:
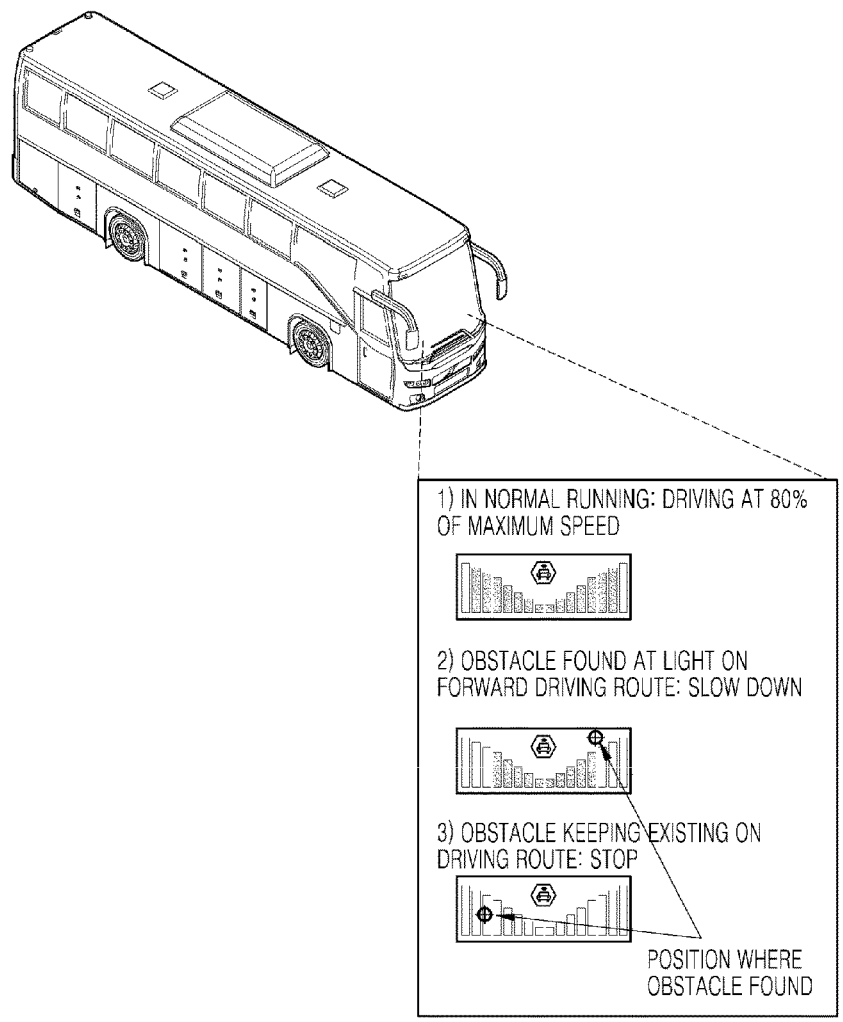
FIG. 6B is a diagram illustrating an example in which an apparatus for passenger recognition and boarding/alighting support of an autonomous vehicle according to an embodiment of the present disclosure provides a speed state of the vehicle.

That is, for safety and information provision of passengers, the display 1340 disposed in the vehicle can display in real time driving information, for example, as shown in FIG. 6B, whether or not of autonomous driving, whether or not of driving at a normal speed (e.g., in-normal driving, 80% of the maximum speed), acceleration driving, deceleration driving (e.g., deceleration due to a found obstacle), a sudden stop state (or, stop), and information about obstacles in the driving route on the display 1340.

For example, the display 1340 installed in the vehicle can display in real time whether it autonomously runs of whether or not autonomous driving now or whether a driver drives, the current speed display and normal running display, deceleration driving for stopping at the next stop, etc. on the display 1340.

Further, when an obstacle is found on the driving route, the display 1340 installed in the vehicle 1000 can display in real time the position, size, etc. on the display 1340 so that passengers can take measures in advance.

Further, for safety and information provision of pedestrians and drivers of other vehicles, the display 1340 installed outside the vehicle 1000 can display in real time a vehicle number, the next appointed stop place, whether or not of autonomous driving, whether or not of driving at a normal speed, acceleration driving, deceleration driving, a sudden stop state, information about an obstacle on the driving route on the display 1340.

That is, pedestrians and drivers of other vehicles find out the current state, the traveling direction, and whether or not of sensing an obstacle of the autonomous vehicle 1000 by checking the next appointed stop place, whether or not of autonomous driving, the current driving speed, and whether or not of sensing an object on the driving route through the display 1340 outside the autonomous vehicle 1000, thereby being able to determine the movement direction, driving direction, speed, etc. of them (pedestrians and drivers of other vehicles).

Further, when the autonomous vehicle 1000 approaches a stop, the vehicle controller 1200 displays whether or not of stop schedule at the stop through the external display 1340 of the autonomous vehicle 1000 so that the passenger candidate group at the stop can check whether the autonomous vehicle 1000 stops. At this time, when determining that the passengers in the vehicle do not alight and the passengers in the vehicle already exceeds the capacity of the vehicle 1000, the vehicle controller 1200 can display a message about non-stop through the external display 1340. Further, when scheduled passenger information is not received through the user terminal 3000 or the stop terminal 4000 and a passenger candidate group is not extracted from an image taken by the external camera of the vehicle, the vehicle controller 1200 can display a message about non-stop through the external display 1340.

The vehicle controller 1200 can collect a reaction image of people at the stop after displaying whether or not of stopping through the external display 1340. The collected image is transmitted to the server 2000 to check whether there is intention to board the vehicle and can be transmit to a next vehicle approaching the stop. For example, when there is a person approaching the vehicle or waving toward the vehicle even seeing the display saying that the vehicle is not stopping, the server 2000 can determine that he/she is a person who wants to board a vehicle in the route.

The sound outputter 1350 may convert an electrical signal provided from the vehicle controller 1200 into an audio signal. The sound outputter 1350 may include at least one speaker.

The haptic output module may generate a tactile output. For example, the haptic output module may operate to allow the user to perceive the output by vibrating a steering wheel, a seat belt, and a seat.

When a processor is not included in the user interface 1300, the user interface 1300 may operate under the control of a processor of another device in the vehicle 1000 or the vehicle controller 1200.

In addition, an object detection module for detecting an object disposed outside the vehicle 1000 may be further included, and the object detection module may generate object information based on sensing data, and transmit the generated object information to the vehicle controller 1200. Examples of the object may include various objects related to the driving of the vehicle 1000, such as a lane, another vehicle, a pedestrian, a motorcycle, a traffic signal, light, a road, a structure, a speed bump, a landmark, and an animal.

That is, the object detection module may be a module included in the sensor 1600 or including the sensing module 1600.

The object detection module may include a camera, radio detection and ranging (Radar), light imaging detection and ranging (Lidar), an ultrasonic sensor, and an infrared sensor.

According to the embodiment, the object detection module may further include constituent elements other than the above-described constituent elements, or may not include some of the constituent elements described above.

The camera may be located at an appropriate position outside the vehicle so as to obtain an image of the outside of the vehicle. The camera may be a mono camera, a stereo camera, an around view monitoring (AVM) camera, or a 360 degree camera.

The camera may include a camera mounted in the vehicle 1000, for example, a camera mounted in a black box to capture an image near the vehicle 1000 using the camera mounted in the vehicle 1000, and provide the captured image to the vehicle controller 1200. The camera may provide an image for the operation of the object detection module.

The camera may obtain location information of an object, distance information from the object, or relative speed information of the object using various image processing algorithms.

The camera may obtain the distance information from the object and the relative speed information of the object from the obtained image based on the change of the size of the object over time.

The camera may acquire the distance information and the relative speed information with respect to the object through, for example, a pin hole model and road surface profiling.

The camera may obtain the distance information from the object and the relative speed information based on disparity information from a stereo image obtained from a stereo camera.

The camera may be disposed close to a front windshield inside the vehicle in order to obtain an image in front of the vehicle. The camera may be disposed near a front bumper or a radiator grill.

The camera may be disposed close to a rear glass in the vehicle in order to obtain an image of the back of the vehicle. The camera may be disposed near a rear bumper, a trunk, or a tail gate.

The camera may be disposed close to at least one side window in the vehicle in order to obtain an image of the side of the vehicle. The camera may be disposed near a side mirror, a fender, or a door.

The camera may provide the obtained image to the vehicle controller 1200.

The vehicle controller 1200 may obtain the distance information to the object and the relative speed information based on disparity information from a stereo image obtained from a stereo camera of the camera.

The radar may include an electromagnetic wave transmitting module and an electromagnetic wave receiving module. The radar may be implemented using a pulse radar method or a continuous wave radar method in terms of radio wave emission principle. The radar may be implemented using a frequency modulated continuous wave (FMCW) method or a frequency shift keying (FSK) method according to a signal waveform in a continuous wave radar method.

The radar may detect an object based on a time-of-flight (TOF) method or a phase-shift method using an electromagnetic wave as a medium, and detect the location of the detected object, the distance to the detected object, and the relative speed of the detected object.

The radar may be disposed at an appropriate position outside the vehicle for sensing an object disposed at the front, back, or side of the vehicle.

The lidar may include a laser transmitting module, and a laser receiving module. The lidar may be embodied using the time of flight (TOF) method or in the phase-shift method.

The lidar may be implemented using a driving method or a non-driving method.

When the lidar is embodied in the driving method, the lidar may rotate by means of a motor, and detect an object near the vehicle 1000. When the lidar is implemented in the non-driving method, the lidar may detect an object within a predetermined range with respect to the vehicle 1000 by means of light steering. The vehicle 1000 may include a plurality of non-drive type lidars.

The lidar may detect an object using the time of flight (TOF) method or the phase-shift method using laser light as a medium, and detect the location of the detected object, the distance from the detected object and the relative speed of the detected object.

The lidar may be disposed at an appropriate position outside the vehicle for sensing an object disposed at the front, back, or side of the vehicle.

The ultrasonic sensor may include an ultrasonic transmitting module, and an ultrasonic receiving module. The ultrasonic sensor may detect an object based on ultrasonic waves, and detect the location of the detected object, the distance from the detected object, and the relative speed of the detected object.

The ultrasonic sensor may be disposed at an appropriate position outside the vehicle for sensing an object at the front, back, or side of the vehicle.

The infrared sensor may include an infrared transmitting module, and an infrared receiving module. The infrared sensor may detect an object based on infrared light, and detect the location of the detected object, the distance from the detected object, and the relative speed of the detected object.

The infrared sensor may be disposed at an appropriate position outside the vehicle for sensing an object at the front, back, or side of the vehicle.

The vehicle controller 1200 may control the overall operation of the object detection module.

The vehicle controller 1200 may compare data sensed by the radar, the lidar, the ultrasonic sensor, and the infrared sensor with pre-stored data so as to detect or classify an object.

The vehicle controller 1200 may detect an object and perform tracking of the object based on the obtained image. The vehicle controller 1200 may perform operations such as calculation of the distance from an object and calculation of the relative speed of the object through image processing algorithms.

For example, the vehicle controller 1200 may obtain the distance information from the object and the relative speed information of the object from the obtained image based on the change of size of the object over time.

For example, the vehicle controller 1200 may obtain the distance information from the object and the relative speed information of the object through, for example, a pin hole model and road surface profiling.

The vehicle controller 1200 may detect an object and perform tracking of the object based on the reflected electromagnetic wave reflected back from the object. The vehicle controller 1200 may perform operations such as calculation of the distance to the object and calculation of the relative speed of the object based on the electromagnetic waves.

The vehicle controller 1200 may detect an object, and perform tracking of the object based on the reflected laser light reflected back from the object. Based on the laser light, the vehicle controller 1200 may perform operations such as calculation of the distance to the object and calculation of the relative speed of the object based on the laser light.

The vehicle controller 1200 may detect an object and perform tracking of the object based on the reflected ultrasonic wave reflected back from the object. The vehicle controller 1200 may perform operations such as calculation of the distance to the object and calculation of the relative speed of the object based on the reflected ultrasonic wave.

The vehicle controller 1200 may detect an object and perform tracking of the object based on the reflected infrared light reflected back from the object. The vehicle controller 1200 may perform operations such as calculation of the distance to the object and calculation of the relative speed of the object based on the infrared light.

Depending on the embodiment, the object detection module may include a separate processor from the vehicle processor 1200. In addition, the radar, the lidar, the ultrasonic sensor, and the infrared sensor may each include a processor.

When a processor is included in the object detection module, the object detection module may be operated under the control of the processor controlled by the vehicle controller 1200.

The vehicle driver 1400 may electrically control the driving of various apparatuses in the vehicle 1000.

The driving controller 1500 may receive a user input for driving.

The sensor 1600 may sense the state of the vehicle 1000 using a sensor mounted on the vehicle 1000, that is, a signal related to the state of the vehicle 1000, and obtain movement route information of the vehicle 1000 according to the sensed signal. The sensor 1600 may provide the obtained movement route information to the vehicle controller 1200.

The sensor 1600 may include a posture sensor (for example, a yaw sensor, a roll sensor, and a pitch sensor), a collision sensor, a wheel sensor, a speed sensor, a tilt sensor, a weight sensor, a heading sensor, a gyro sensor, a position module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, and a brake pedal position sensor, but is not limited thereto.

The sensor 1600 may acquire sensing signals for information such as vehicle posture information, vehicle collision information, vehicle direction information, vehicle position information (GPS information), vehicle angle information, vehicle speed information, vehicle acceleration information, vehicle tilt information, vehicle forward/reverse movement information, battery information, fuel information, tire information, vehicle lamp information, vehicle interior temperature information, vehicle interior humidity information, a steering wheel rotation angle, vehicle exterior illuminance, pressure on an acceleration pedal, and pressure on a brake pedal.

The sensor 1600 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), but is not limited thereto.

The sensor 1600 may generate vehicle status information based on sensing data. The vehicle state information may be information generated based on data sensed by various sensors included in the inside of the vehicle.

The vehicle status information may include at least one among posture information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, vehicle interior temperature information, vehicle interior humidity information, pedal position information, and vehicle engine temperature information.

The operator 1700 may control various operations of the vehicle 1000. The operator 1700 may operate in the autonomous driving mode.

The operator 1700 may include a driving module, an unparking module, and a parking module.

Depending on the embodiment, the operator 1700 may further include constituent elements other than the constituent elements to be described, or may not include some of the constitute elements.

The operator 1700 may include a processor under the control of the vehicle controller 1200. Each module of the operator 1700 may include a processor individually.

Depending on the embodiment, when the operator 1700 is implemented as software, it may be a sub-concept of the vehicle controller 1200.

The driving module may perform driving of the vehicle 1000.

The driving module may receive object information from the object detection module, and provide a control signal to a vehicle driving module to perform the driving of the vehicle 1000.

The driving module may receive a signal from an external device through the vehicle communicator 1100, and provide a control signal to the vehicle driving module, so that the driving of the vehicle 1000 may be performed.

In the unparking module, unparking of the vehicle 1000 may be performed.

In the unparking module, navigation information may be provided from the navigator 1800, and a control signal may be provided to the vehicle driving module, so that the unparking of the vehicle 1000 may be performed.

In the unparking module, object information may be received from the object detection module, and a control signal may be provided to the vehicle driving module, so that the unparking of the vehicle 1000 may be performed.

In the unparking module, a signal may be provided from an external device through the vehicle communicator 1100, and a control signal may be provided to the vehicle driving module, so that the unparking of the vehicle 1000 may be performed.

In the parking module, parking of the vehicle 1000 may be performed.

In the parking module, navigation information may be provided from the navigator 1800, and a control signal may be provided to the vehicle driving module, so that the parking of the vehicle 1000 may be performed.

In the parking module, object information may be provided from the object detection module, and a control signal may be provided to the vehicle driving module, so that the parking of the vehicle 1000 may be performed.

In the parking module, a signal may be provided from the external device through the vehicle communicator 1100, and a control signal may be provided to the vehicle driving module so that the parking of the vehicle 1000 may be performed.

The navigator 1800 may provide navigation information to the vehicle controller 1200. The navigation information may include at least one of map information, set destination information, route information according to destination setting, information about various objects on the route, lane information, or current location information of the vehicle.

The navigator 1800 may provide the vehicle controller 1200 with a parking lot map of the parking lot entered by the vehicle 1000. The vehicle controller 1200, when the vehicle 1000 enters a parking lot, may be provided with a map of the parking lot from the navigator 1800, and may reflect a calculated movement route and fixed identification information to the parking lot map so as to generate map data.

The navigator 1800 may include a memory. The memory may store navigation information. The navigation information may be updated by information received through the vehicle communicator 1100. The navigator 1800 may be controlled by an internal processor, or may operate by receiving an external signal, for example, a control signal from the vehicle controller 1200, but the present disclosure is not limited thereto.

The driving module of the operator 1700 may be provided with the navigation information from the navigator 1800, and may provide a control signal to the vehicle driving module so that driving of the vehicle 1000 may be performed.

The vehicle storage 1900 may be electrically connected to the vehicle controller 1200. The vehicle storage 1900 may store basic data for each unit of an advertisement time slot setting apparatus, control data for operation control of each unit of an advertisement time slot apparatus, and input/output data.

The vehicle storage 1900 may store content in the form of at least one of an image or a sound, and content to be stored may include a plurality of content.

The vehicle storage 1900 may be various storage devices such as a ROM, a RAM, an EPROM, a flash drive, and a hard drive, in terms of hardware. The vehicle storage 1900 may store various data for the overall operation of the vehicle 100, such as a program for processing or controlling the vehicle controller 1200. The vehicle storage 1900 may be integrally formed with the vehicle controller 1200, or implemented as a sub-component of the vehicle controller 1200.

Hereafter, a method for passenger recognition and boarding/alighting support of an autonomous vehicle is described with reference to FIG. 8.

Figure 8:
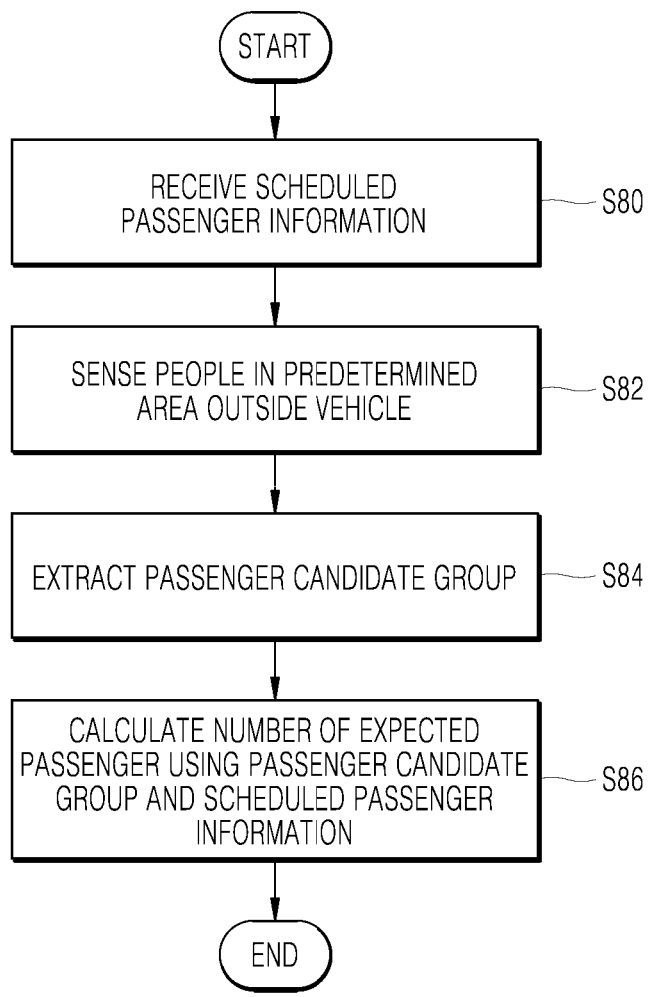
FIG. 8 is a flowchart illustrating a method of passenger recognition and boarding/alighting support of an autonomous vehicle according to an embodiment of the present disclosure.

FIG. 8 is a flowchart illustrating a method of passenger recognition and boarding/alighting support of an autonomous vehicle according to an embodiment of the present disclosure.

Referring to FIG. 8, in step S80, the vehicle communicator 1100 according to an embodiment of the present disclosure can receive scheduled passenger information on the basis of a downlink grant (DL grant).

Here, the information, which is information input through the user terminal 3000 and/or the stop terminal 4000, may mean user information that people who want to board input to make a reservation to board through the terminals 3000 and 4000.

For example, a boarding aspirant wants to board the autonomous vehicle 1000, he/she can input desired boarding information, that is, scheduled passenger information such as his/her name, face picture, belongings, individual ID number, a desired boarding place, a desired stop place, and a desired boarding time.

Further, referring to FIG. 2 described above, the vehicle communicator 1100 can perform the process of initial access (S20) to a 5G network and the process of random access to the 5G network on the basis of an SSB (synchronization signal block) (S21). Next, the 5G network can transmit a UL grant for scheduling transmission of specific information to the autonomous vehicle (S22), the autonomous vehicle 1000 can transmit specific information to the 5G network on the basis of the UL grant (S23), the 5G network can determine whether to remotely control the vehicle (S24), the autonomous vehicle can receive a DL grant through a physical downlink control channel to receive a response to the specific information from the 5G network (S25), and the 5G network can receive information (or signal) related to remote control, scheduled passenger information input through the external terminals 3000 and 4000, etc. from the autonomous vehicle 1000 on the basis of the DL grant (S26).

In step S82, the sensor 1600 can sense people outside the vehicle in a predetermined area at an appointed stop place.

Referring to FIG. 5A, the predetermined area may be set within a predetermined distance R from a reference point (e.g., an appointed stop place, a stop, and the inlet/outlet door of the autonomous vehicle 1000), and may be set in advance in consideration of the sensing range of the sensor 1600, and the ability of processing extraction calculation of a passenger candidate group of the vehicle controller 1200 in a section.

For example, the sensor 1600 can measure the distance of each of external people outside from the inlet/outlet door of the vehicle 1000 using a lidar (not shown) and/or a radar (not shown), and can photograph the people within the predetermined range R outside the vehicle 1000 through an external camera (not shown) or can sense people outside the vehicle 1000 through communication (a 5G network, Bluetooth, etc.) with terminals that the external people have.

In step S84, the vehicle controller 1200 can extract a passenger candidate group by analyzing people sensed in a predetermined area outside the vehicle through the sensor 1600.

For example, the vehicle controller 1200 photographs people in a predetermined area outside the vehicle through a camera by controlling the sensor 1600 and analyzes at least one of specific actions, such as the faces, motions, and movement directions of the photographed people, thereby being able to extract a passenger candidate group.

That is, the vehicle controller 1200 extracts feature such as the faces, motions, and movement directions at each frame of videos taken through an external camera (not shown) of the autonomous vehicle 1000 and classifies the features in common of the features through machine learning, thereby being able to extract a passenger candidate group.

For example, the vehicle controller 1200 may include a deep neural network model trained in advance. That is, the deep neural network model may be a deep neural network model trained in advance using features, which are extracted and found from specific actions, motions, movement directions, and facial expressions of a passenger candidate group, as training data.

For example, specific actions, faces, motions, movement directions, etc. in frames taken by a camera, for example, body gestures, hand gestures, actions, etc. for calling the vehicle 1000 or waiting may be the features for learning a deep neural network model. A hand gesture for stopping and waiting toward a vehicle, a hand gesture for calling a vehicle, a figure of running or quickly walking to a vehicle, and a tense expression toward a vehicle, etc. may be used as training data for extracting a passenger candidate group from a deep neural network model.

Accordingly, the vehicle controller 1200 can extract a passenger candidate group by analyzing at least one of the faces, motions, and movement directions of people outside the vehicle, using a deep neural network model trained in advance.

Here, the movement directions of people outside the vehicle can be analyzed by taking a video through a camera, but may be analyzed through 5G network communication, Bluetooth communication, and GPS position check with carried terminals.

Further, the vehicle controller 1200 analyzes the faces of external people sensed in the predetermined area, and when there is a previous record of boarding the autonomous vehicle 1000, the vehicle controller 1200 can extract the people as a passenger candidate group expected to board at this time too.

For example, when comparing face information of external people sensed through the sensor 1600 with scheduled passenger information acquired before, and determining that they are the same people, the vehicle controller 1200 can extract them as a passenger candidate group in consideration of the number of times of boarding, whether or not boarding at a specific time band, a boarding cycle, etc. using a deep neural network model.

In step S86, the vehicle controller 1200 can calculate the number of reserved passengers using the extracted passenger candidate group and the received scheduled passenger information.

The vehicle controller 1200 can acquire scheduled passenger information input through the user terminal 3000 and/or the stop terminal 4000, using a network, and can calculate the number of reserved passengers, using the scheduled passenger information input and acquired through the terminals 3000 and 400 and the information of the passenger candidate group extracted using the deep neural network model trained in advance.

In other words, the vehicle controller 1200 can calculate the number of reserved passengers, using the scheduled passenger information input through an external terminal, for example, the user terminal 3000 and/or the stop terminal 4000, and the information of the passenger candidate group extracted using the deep neural network model trained in advance.

Further, the vehicle controller 1200 compares the faces of people pertaining to the passenger candidate group and the face pictures in the scheduled passenger information, and calculates the number of matched people, and can calculate the number of reserved passengers by subtracting the calculated number of people from the sum of the number of the people in the passenger candidate group and the number of scheduled passengers.

The vehicle controller 1200 can determine boarding standby time of the vehicle on the basis of the number of the reserved passengers. At this time, the vehicle controller 1200 can divide the predetermined area into several sections on the basis of separation distances with respect to the appointed stop place, and can differently adjust the boarding standby time in accordance with sections where the reserved passengers exist of the several sections.

Further, the vehicle controller 1200 can determine the passenger types of the reserved passengers on the basis of at least one of the faces, body shapes, walks, and belongings of the people outside the vehicle, and can readjust the adjusted boarding standby time or adjust the separation distances for discriminating sections where expectant passengers exist, on the basis of the passenger types of the reserved passengers.

Further, the vehicle controller 1200 can run the vehicle by selecting one of a fixed route running mode and a flexible route running mode by reflecting passenger demand information and driving area information. Here, the passenger demand information, which is scheduled passenger information and passenger information of the autonomous vehicle for each day and time band, can be determined using a deep neural network model trained in advance.

The description of the above apparatus for passenger recognition and boarding support of an autonomous vehicle can be applied to the method for passenger recognition and boarding/alighting support of an autonomous vehicle according to an embodiment of the present disclosure. Accordingly, in relation to the method for passenger recognition and boarding/alighting support of an autonomous vehicle, description of the same configuration as the apparatus for passenger recognition and boarding/alighting support of an autonomous vehicle is omitted.

Figure 9:
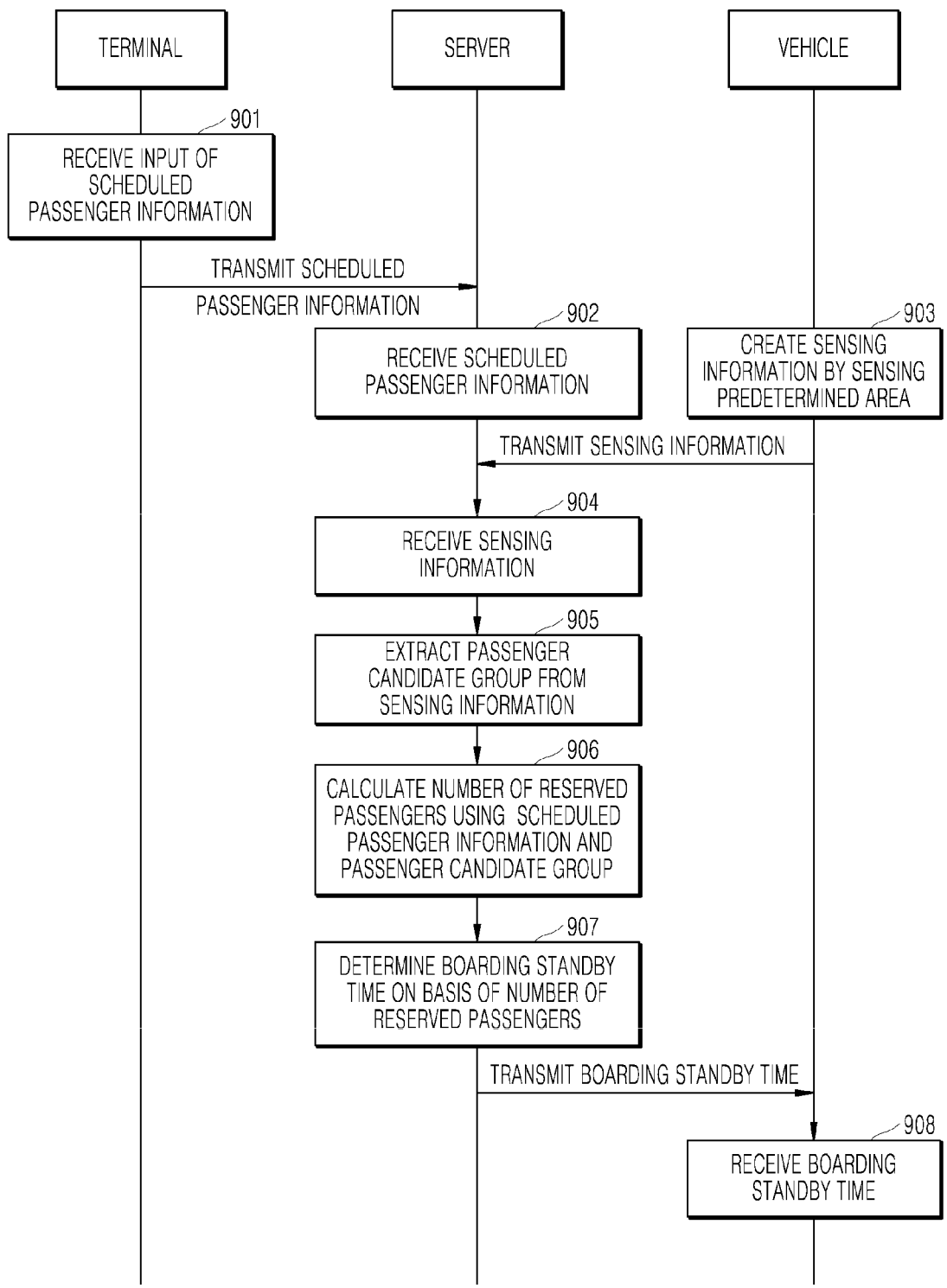
FIG. 9 is a message flowchart among a terminal, a server, and a vehicle for illustrating a method of passenger recognition and boarding/alighting support of an autonomous vehicle according to an embodiment of the present disclosure.

FIG. 9 is a message flowchart among a terminal, a server, and a vehicle for illustrating a method of passenger recognition and boarding/alighting support of an autonomous vehicle according to an embodiment of the present disclosure. Here, the apparatus for passenger recognition and boarding/alighting support of an autonomous vehicle may be included in a server.

Referring to FIG. 9, a terminal (e.g., a user terminal or a stop terminal) can receive scheduled passenger information from a person who wants to board (boarding expectant) at an appointed stop place (S901) and can transmit the input scheduled passenger information to the sever. Here, the scheduled passenger information may include, for example, his/her name, face picture, belongings, personal ID number, an appointed boarding place, an appointed alighting place, a desired boarding time, etc.

The server can receive the scheduled passenger information from the terminal (902).

Further, the vehicle (e.g., autonomous vehicle) can create sensing information by sensing people within a predetermined area on the basis of an appointed stop place (e.g., a stop) (903) and can transmit the created sensing information to the server. Here, the sensing information, for example, may be a photographed image of the people outside the vehicle.

The server can receive the sensing information from the vehicle (904) and can extract passenger candidate group from the received sensing information (905). At this time, the server can extract the passenger candidate group by analyzing at least one of the faces, motions, and movement directions of the people sensed in the predetermined area outside the vehicle on the basis of the appointed stop place.

Thereafter, the server can calculate the number of reserved passengers, using the scheduled passenger information and the passenger candidate group (906) and can determine boarding standby time of the vehicle at the appointed stop place on the basis of the calculated number of reserved passengers (907).

When calculating the number of reserved passengers, the server compares the faces of people pertaining to the passenger candidate group and the face pictures in the scheduled passenger information, and calculates the number of matched people, and can calculate the number of reserved passengers by subtracting the calculated number of people from the sum of the number of the people in the passenger candidate group and the number of scheduled passengers.

Further, when determining the boarding standby time, the sever, for example, can check the range to which the number of reserved passengers pertains and determine time corresponding to the checked range as boarding standby time, or can determine a set time as the boarding standby time. For example, when the number of reserved passengers is seven, the server can determine 2 minutes corresponding to the range of 5~10 people as boarding standby time.

The server can transmit the determined boarding standby time to the vehicle. At this time, the server can transmit the reserved passengers together with the boarding standby time.

The vehicle receives the boarding standby time from the server (908) and opens the inlet/outlet door for the received boarding standby time so that reserved passengers can board.

Embodiments of the present disclosure can be implemented in the type of a recording medium including computer-executable commands such as a program module that is executed by a computer. A computer-readable medium may be a certain available medium that can be accessed by a computer and includes all of a volatile and nonvolatile media, and separable and non-separable media. Further, the computer-readable medium may include all of computer storage media. The computer storage medium includes volatile and nonvolatile, and separable and non-separable media that are achieved any method or technology that stores information such as computer-readable instructions, data architectures, program modules, or other data.

The above description is provided as an exemplary embodiment of the present disclosure and it should be understood that the present disclosure may be easily modified in other various ways without changing the spirit or the necessary features of the present disclosure by those skilled in the art. Therefore, the embodiments described above are only examples and should not be construed as being limitative in all respects. For example, the components described as single parts may be divided and the components described as separate parts may be integrated.

The scope of the present disclosure is defined by the following claims rather than the above detailed description, and all of changes and modifications obtained from the meaning and range of claims and equivalent concepts should be construed as being included in the scope of the present disclosure.

What is claimed is:

1. An apparatus for passenger recognition and boarding/alighting support of an autonomous vehicle, the apparatus comprising:
    a vehicle communicator configured to receive scheduled passenger information about a scheduled passenger from a user terminal or a stop terminal;
    a sensor configured to sense people within a predetermined area outside a vehicle on the basis of an appointed stop place; and
    a vehicle controller configured to extract a passenger candidate group by analyzing the people outside the vehicle sensed by the sensor and calculate a number of reserved passengers using the extracted passenger candidate group and the received scheduled passenger information,
    wherein the vehicle controller is configured to:
        determine boarding standby time of the vehicle on the basis of the number of the reserved passengers,
        divide the predetermined area into several sections on the basis of separation distances with respect to the appointed stop place, and
        adjust the boarding standby time in accordance with sections where the reserved passengers are located.

2. The apparatus of claim 1, wherein the vehicle controller extracts the passenger candidate group by analyzing at least one of faces, motions, and movement directions of the people sensed in the predetermined area outside the vehicle.

3. The apparatus of claim 2, wherein the vehicle controller compares the faces of people pertaining to the passenger candidate group and face pictures in the scheduled passenger information, and calculates the number of matched people, and calculates the number of reserved passengers by subtracting the number of matched people from the sum of the number of the people in the passenger candidate group and the number of scheduled passengers.

4. The apparatus of claim 2, wherein the vehicle controller determines passenger types on the basis of at least one of faces, body shapes, walks, and belongings of the people pertaining to the reserved passengers and determines a stop position of the vehicle on the basis of a position of a passenger pertaining to the mobility handicapped.

5. The apparatus of claim 1, wherein the vehicle controller determines passenger types of the reserved passengers on the basis of at least one of faces, body shapes, walks, and belongings of the people outside the vehicle, and readjusts the adjusted boarding standby time or adjusts the separation distances for discriminating sections where expectant passengers exist, on the basis of the passenger types of the reserved passengers.

6. The apparatus of claim 1, wherein the vehicle controller determines the passenger candidate group existing in a section closest to the appointed stop place of the several sections as first fixed passengers, and determines the scheduled passengers as second fixed passengers, and calculates the fixed passengers obtained by subtracting duplicate people from the sum of the number of the first fixed passengers and the second fixed passengers as the reserved passengers.

7. The apparatus of claim 1, wherein the vehicle controller runs the vehicle by selecting one of a fixed route running mode and a flexible route running mode by reflecting passenger demand information and driving area information, and the passenger demand information is determined using a deep neural network model trained in advance with scheduled passenger information and passenger information of the autonomous vehicle for each day and time band.

8. The apparatus of claim 7, wherein the vehicle controller stops the vehicle at every predetermined stop on a determined route when the fixed route running mode is selected, stops the vehicle at stops where a passenger who will alight exists in the vehicle or where a reserved passenger exists, of the predetermined stops on the predetermined route, and stops the vehicle at a point, where there is a call for stopping the vehicle from the user terminal or the stop terminal, on the predetermined route.

9. The apparatus of claim 1, wherein when the vehicle stops for a passenger to board or alight, the appointed stop place is a point where an inlet/outlet door of the vehicle is disposed, and the sensor senses people outside the vehicle within a predetermined area on the basis of the inlet/outlet door.

10. The apparatus of claim 1, further comprising an external display configured to provide driving information to people outside the vehicle, and the vehicle controller determines whether to stop the vehicle at the appointed stop place in accordance with the calculated number of the reserved passengers, displays whether to stop the vehicle and the boarding standby time through the external display, and extracts again the passenger candidate group by analyzing at least one of faces, motions, and movement directions of the people sensed by the sensor in the predetermined area.

11. The apparatus of claim 1, wherein the vehicle communicator performs a procedure of initial access to a 5G network on the basis of an SSB (synchronization signal block), and receives scheduled passenger information about a scheduled passenger from the user terminal or the stop terminal on the basis of a downlink grant (DL grant).

12. A method for passenger recognition and boarding/alighting support of an autonomous vehicle, the method comprising:

receiving scheduled passenger information about a scheduled passenger from a user terminal or a stop terminal on the basis of a downlink grant (DL grant);

sensing people within a predetermined area outside a vehicle on the basis of an appointed stop place;

extracting a passenger candidate group by analyzing the sensed people outside the vehicle;

calculating a number of reserved passengers using the extracted passenger candidate group and the received scheduled passenger information;

determining boarding standby time of the vehicle on the basis of the number of the reserved passengers;

dividing the predetermined area into several sections on the basis of separation distances with respect to the appointed stop place; and adjusting the boarding standby time in accordance with sections where the reserved passengers are located.

13. The method of claim 12, wherein the extracting of a passenger candidate group includes extracting the passenger candidate group by analyzing at least one of faces, motions, and movement directions of the people sensed in the predetermined area outside the vehicle.

14. The method of claim 12, wherein the calculating of the number of reserved passengers includes:

comparing faces of people pertaining to the passenger candidate group and face pictures in the scheduled passenger information and calculating the number of matched people; and calculating the number of reserved passengers by subtracting the number of matched people from the sum of the number of the people in the passenger candidate group and the number of scheduled passengers.

15. The method of claim 12, further comprising:

determining the passenger types of the reserved passengers on the basis of at least one of faces, body shapes, walks, and belongings of the people outside the vehicle; and readjusting the adjusted boarding standby time or adjusting the separation distances for discriminating sections where the reserved passengers exist, on the basis of the passenger types of the reserved passengers.

16. The method of claim 12, further comprising running the vehicle by selecting one of a fixed route running mode and a flexible route running mode by reflecting passenger demand information and driving area information, and the passenger demand information is determined using a deep neural network model trained in advance with scheduled passenger information and passenger information of the autonomous vehicle for each day and time band.

17. A server for passenger recognition and boarding/alighting support of an autonomous vehicle, the server comprising:

a receiver that receives scheduled passenger information about a scheduled passenger at an appointed stop place from a user terminal or a stop terminal, receives sensing information by sensing a person in a predetermined area on the basis of the appointed stop place from the autonomous vehicle; and a processor that extracts a passenger candidate group from the sensing information and calculates a number of reserved passengers using the extracted passenger candidate group and the received scheduled passenger information, wherein the processor is configured to determine boarding standby time of the autonomous vehicle on the basis of the number of reserved passengers and transmit the boarding standby time to the autonomous vehicle through a transmitter.

\* \* \* \* \*